United States Patent
Bolin et al.

(10) Patent No.: US 9,826,561 B2
(45) Date of Patent: Nov. 21, 2017

(54) SYSTEM AND METHOD FOR ALLOWING ACCESS TO ELECTRONIC DEVICES USING A BODY AREA NETWORK

(71) Applicant: Sony Mobile Communications Inc., Tokyo (JP)

(72) Inventors: Thomas Bolin, Lund (SE); Henrik Bengtsson, Lund (SE); Ola Thörn, Limhamn (SE); Kristian Tärnhed, Lund (SE); Malin Larsson, Malmö (SE); Aleksandar Rodzevski, Malmö (SE); Erik Bengtsson, Eslöv (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 179 days.

(21) Appl. No.: 14/509,569

(22) Filed: Oct. 8, 2014

(65) Prior Publication Data
US 2015/0163221 A1    Jun. 11, 2015

Related U.S. Application Data

(60) Provisional application No. 61/912,223, filed on Dec. 5, 2013, provisional application No. 61/942,753, filed on Feb. 21, 2014.

(51) Int. Cl.
*G06F 7/04* (2006.01)
*H04W 76/02* (2009.01)
(Continued)

(52) U.S. Cl.
CPC .......... *H04W 76/023* (2013.01); *G06F 21/32* (2013.01); *G06F 21/34* (2013.01); *G06F 21/35* (2013.01);
(Continued)

(58) Field of Classification Search
CPC .. G06F 21/602; G06F 21/6236; G06F 21/568; G06F 21/56; H04L 63/1408; H04L 63/1441; H04L 63/0428; H04L 63/123
See application file for complete search history.

(56) References Cited

U.S. PATENT DOCUMENTS 5,796,827 A * 8/1998 Coppersmith ....... A61B 5/0024
                                                      380/265
6,211,799 B1   4/2001 Post et al.
(Continued)

FOREIGN PATENT DOCUMENTS

EP    1024626 A1   8/2000
EP    1102215 A2   5/2001
(Continued)

OTHER PUBLICATIONS

PCT International Search Report and Written Opinion issued for corresponding international application No. PCT/IB2014/066574, dated Mar. 16, 2015, 11 pages.
(Continued)

*Primary Examiner* — Hadi Armouche
*Assistant Examiner* — Abdullah Almamun
(74) *Attorney, Agent, or Firm* — Tucker Ellis LLP

(57) ABSTRACT

A method, system and devices for creating access to a wireless communication device by using BAN, comprising detecting the presence of a user's body by using a BAN enabled access module connected to the wireless communication device, collecting biometric data of the user and receiving authentication data from a BAN enabled peripheral device through BAN by using the BAN enabled access module and allowing access to the wireless communication device if the collected biometric data and the received authentication data are valid.

31 Claims, 16 Drawing Sheets

(51) Int. Cl.

| | |
|---|---|
| *H04B 7/26* | (2006.01) |
| *H04B 13/00* | (2006.01) |
| *H04L 29/06* | (2006.01) |
| *H04W 12/06* | (2009.01) |
| *G06F 21/34* | (2013.01) |
| *G06F 21/35* | (2013.01) |
| *G07C 9/00* | (2006.01) |
| *H04L 9/32* | (2006.01) |
| *H04L 9/08* | (2006.01) |
| *H04W 4/00* | (2009.01) |
| *G06F 21/32* | (2013.01) |
| *H04L 12/26* | (2006.01) |
| *H04M 1/725* | (2006.01) |
| *B60R 25/20* | (2013.01) |
| *H04W 8/00* | (2009.01) |

(52) U.S. Cl.
CPC ...... *G07C 9/00111* (2013.01); *G07C 9/00309* (2013.01); *H04B 7/26* (2013.01); *H04B 13/005* (2013.01); *H04L 9/0827* (2013.01); *H04L 9/3215* (2013.01); *H04L 43/10* (2013.01); *H04L 63/0853* (2013.01); *H04L 63/0861* (2013.01); *H04M 1/7253* (2013.01); *H04W 4/008* (2013.01); *H04W 12/06* (2013.01); *B60R 25/2027* (2013.01); *G07C 2009/00809* (2013.01); *H04L 63/18* (2013.01); *H04L 2209/805* (2013.01); *H04L 2209/88* (2013.01); *H04W 8/005* (2013.01)

(56) References Cited

U.S. PATENT DOCUMENTS

| | | | |
|---|---|---|---|
| 6,580,356 B1 * | 6/2003 | Alt | B60R 25/23 340/10.41 |
| 7,202,773 B1 | 4/2007 | Oba et al. | |
| 8,867,995 B2 | 10/2014 | Kim et al. | |
| 2002/0030585 A1 * | 3/2002 | Doi | A61B 5/0028 340/5.64 |
| 2002/0128030 A1 * | 9/2002 | Eiden | H04B 13/005 455/519 |
| 2004/0203381 A1 | 10/2004 | Cahn et al. | |
| 2004/0248513 A1 | 12/2004 | Glass et al. | |
| 2005/0008148 A1 | 1/2005 | Jacobson | |
| 2005/0221798 A1 * | 10/2005 | Sengupta | H04M 1/67 455/411 |
| 2005/0243061 A1 | 11/2005 | Liberty et al. | |
| 2006/0109135 A1 | 5/2006 | Donat et al. | |
| 2006/0258408 A1 | 11/2006 | Tuomela et al. | |
| 2007/0145119 A1 | 6/2007 | Rhelimi | |
| 2007/0190940 A1 | 8/2007 | Lee et al. | |
| 2007/0282783 A1 | 12/2007 | Singh | |
| 2008/0259043 A1 | 10/2008 | Buil et al. | |
| 2009/0094681 A1 | 4/2009 | Sadler et al. | |
| 2009/0233548 A1 | 9/2009 | Andersson et al. | |
| 2010/0003917 A1 | 1/2010 | Hebiguchi et al. | |
| 2010/0113950 A1 | 5/2010 | Lin et al. | |
| 2010/0246643 A1 * | 9/2010 | Lim | H04B 1/69 375/147 |
| 2010/0263031 A1 | 10/2010 | Tsuchiya | |
| 2010/0277435 A1 * | 11/2010 | Han | G06F 3/0416 345/174 |
| 2010/0311326 A1 | 12/2010 | Klabunde et al. | |
| 2010/0312071 A1 | 12/2010 | Schenk | |
| 2011/0205156 A1 | 8/2011 | Gomez et al. | |
| 2012/0026129 A1 * | 2/2012 | Kawakami | G06F 1/1643 345/174 |
| 2012/0071149 A1 * | 3/2012 | Bandyopadhyay | G06F 1/1643 455/418 |
| 2012/0133605 A1 | 5/2012 | Tanaka | |
| 2012/0249409 A1 | 10/2012 | Toney et al. | |
| 2012/0324368 A1 | 12/2012 | Putz et al. | |
| 2013/0017789 A1 | 1/2013 | Chi et al. | |
| 2013/0165048 A1 * | 6/2013 | Karlsson | H04W 4/008 455/41.3 |
| 2013/0174049 A1 | 7/2013 | Townsend et al. | |
| 2014/0009262 A1 * | 1/2014 | Robertson | A61B 5/0006 340/5.52 |
| 2014/0085050 A1 * | 3/2014 | Luna | G07C 9/00087 340/5.82 |
| 2014/0325614 A1 | 10/2014 | Rhelimi | |

FOREIGN PATENT DOCUMENTS

| | | |
|---|---|---|
| EP | 1220501 A2 | 7/2002 |
| EP | 2018038 A2 | 1/2009 |
| EP | 2378748 A1 | 10/2011 |
| EP | 2600319 A1 | 6/2013 |
| JP | 2007073462 A | 4/2008 |
| JP | 2009049951 A | 3/2009 |
| WO | 2007096810 A1 | 8/2007 |
| WO | 2007129237 A1 | 11/2007 |
| WO | 2011021531 A1 | 2/2011 |

OTHER PUBLICATIONS

"The Nymi White Paper", Nov. 19, 2013, XP055115588, pp. 3,5,6,14-21.

Bionym Inc.: "Nymi by Bionym" Sep. 2, 2013, YouTube Video retrieved from the Internet May 7, 2014 at URL: https://www.youtube.com/watch?v=jUO7Qnmc8vE#t=37.

Zimmerman, "Personal Area Networks: Near-Field intrabody communication," XP 000635090 IBM Systems Journal, vol. 35, Nos. 3&4, 1996, pp. 609-617.

W. Knight, "Human Handshake Opens Data Stream," NewScientist.com, Oct. 7, 2002, http://www.newscientist.com/article/dn2891-human-handshake-opens-data-stream.html.

W. Knight, "Skin Used to Transmit Key Data," NewScientist.com, Aug. 5, 2004, http://www.newscientist.com/article/dn6247-skin-used-to-transmit-key-data.html.

* cited by examiner

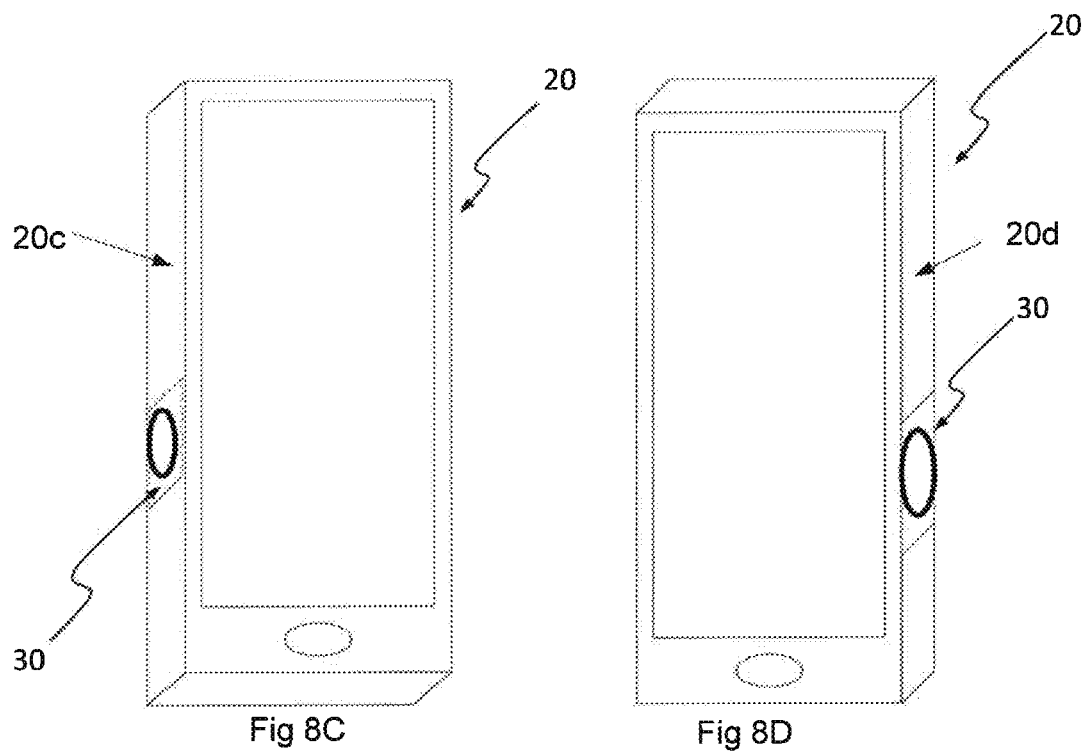
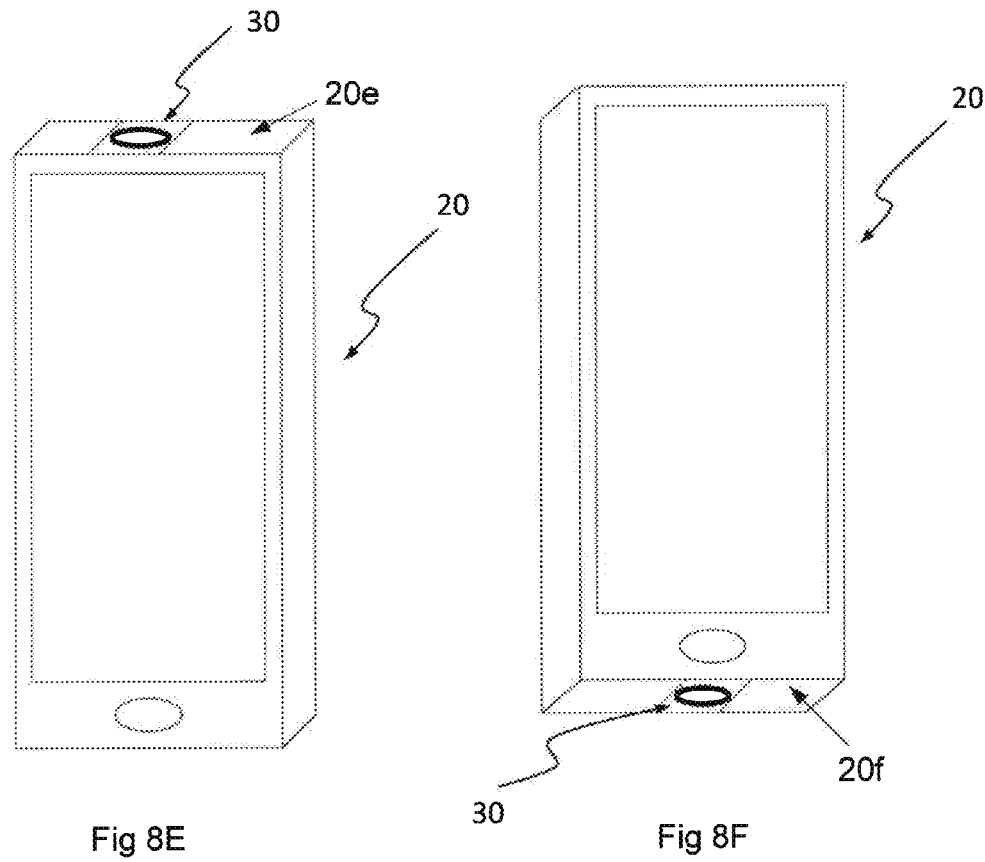

SYSTEM AND METHOD FOR ALLOWING ACCESS TO ELECTRONIC DEVICES USING A BODY AREA NETWORK

CROSS-REFERENCE TO RELATED APPLICATIONS

This application claims priority under 35 U.S.C. §119, based on U.S. Provisional Application No. 61/912,223, filed Dec. 5, 2013, and U.S. Provisional Application No. 61/942,753, filed Feb. 21, 2014, the disclosures of which are hereby incorporated by reference herein.

TECHNICAL FIELD

The present disclosure relates generally to wireless communication devices, and particularly to wireless communication devices configured to communicate with a consumer electronic device worn by a user, such as on the wrist or hand, using the user's own body as a communications medium.

BACKGROUND ART

There is an emerging consumer market for certain devices that are used as companion products to smartphone devices. Their popularity can be traced, in part, to the variety of features they provide to a user. For example, one such device is a wearable device, such as a ring worn on the user's finger, a necklace, glasses, or a "wristlet" (e.g., a watch or wristband) that is worn around a user's wrist. Typically, such wearable devices may provide different features, such as a logging function that monitors the user's motion and resting activities, and then sends a report on the detected motion and activities to the user's smartphone for storage in memory. Another feature allows the wearable devices to be used as a personal token to automatically gain access to a smartphone that has been locked. Particularly, a wearable device worn by the user may communicate with the user's smartphone, thereby permitting the user to bypass the manual entry of a predetermined unlock sequence associated with the smartphone.

Many people protect their portable devices with authentication data such as a 4-6 digit key, a password, or a graphical pattern, and it is generally seen as too short and too easy to break. Longer passwords are possible to use, however, many people consider it cumbersome to do the unlock procedure every time the portable device is used. Yet many people have no protection at all.

Password or authentication data is a proof of qualification, competence or clearance issued to an individual. Examples of authentication data include, certifications, security clearance, identification documents, badges, passwords, user names, keys, and so on. Authentication data in information technology systems, IT systems, are widely used to control access to information or other resources. The classic combination of a user account number or name and a secret password is widely used example of IT systems authentication data. An increasing number of IT systems use other forms of documentation of authentication data, such as biometric credential technologies. There are several examples of biometric credential technologies that could be used for this purpose such as fingerprints, face and voice recognition, iris recognition or retinal scans, and so on. It is basically up to the user to determine the level of security needed for that particular case.

A biometric method that is known is to use a fingerprint scanner, which can be used to gain access or to unlock a smartphone that has been locked. The procedure of scanning is however associated with having to initiate the scanning through entering a menu setting which can be cumbersome. It is also a known fact that fingerprint scanning tools can be spoofed and therefore not completely secure. The security level of fingerprint scanning as the sole means for phone access has also been demonstrated not to be 100% proof.

Hence, the security level on the identification means of today does not fulfill all requirements.

SUMMARY OF THE INVENTION

With the above description in mind, then, an aspect of some embodiments of the present invention is to provide a system and a method for the user to access or unlock a phone, tablet etc. by simple and quick means and at a higher security level than at present by utilizing Body Area Network, BAN, communication in parallel with a fingerprint scanner, which seeks to mitigate, alleviate or eliminate one or more of the above-identified deficiencies in the art and disadvantages singly or in any combination.

The present disclosure also provides wireless devices (e.g., a wearable device such as a wristlet and a smartphone, tablet, door, computer etc.) and a corresponding method for initializing and pairing a short-range Body Area Network (BAN) communications link between the wireless devices. More specifically, the wireless devices are associated with a user, and are configured to employ the user's own body as a transmission medium to communicate at least some of the signals and data required to "BAN pair" the wireless devices (i.e., pair the two devices using the user's own body as a communications medium).

An aspect of the present invention relates to method, performed in a Body Area Network, BAN, enabled wireless communication device, for creating access to the wireless communication device. The method comprises detecting the presence of a user's body by using a BAN enabled access module connected to the communication device, collecting a biometric data of the user by using a scanner comprised in the BAN enabled access module, receiving authentication data by using the BAN enabled access module through BAN from a BAN enabled peripheral device and allowing access to said wireless communication device if the collected biometric data and the received authentication data are valid.

In one embodiment, the step of collecting biometric data comprises starting the scanner when detecting a body part of the user by the BAN enabled access module and collecting biometric data by scanning the body part.

In one embodiment, the method comprises sending a request for the authentication data at the same time as the scanner starts collecting biometric data.

In one embodiment, the step of allowing access comprises analysing if the received authentication data and the collected biometric data are valid and unlocking the wireless communication device if the received authentication data and the collected biometric data are valid.

In one embodiment, method comprises detecting that the BAN enabled peripheral device is proximate to the wireless communication device, determining whether both the communication device and the BAN enabled peripheral device are in contact with the user's body and pairing the wireless communication device with the BAN enabled peripheral device using BAN if both the communication device and the BAN enabled peripheral device are in contact with the user's body.

In one embodiment, pairing with the BAN enabled peripheral device using a BAN if both the wireless communication device and the BAN enabled peripheral device are in contact with said user's body comprises generating a key within said wireless communication device based on a unique identifier received over a first communication link from the BAN enabled peripheral device, transmitting the generated key to the BAN enabled peripheral device over the first communication link receiving the key from the BAN enabled peripheral device over a second communication link, and pairing the wireless communication device with the BAN enabled peripheral device if the key received over the second communication link is a valid key.

In one embodiment, the wireless communication device is configured to display a passcode lock screen to the user. In these cases, the method further comprises bypassing the passcode lock screen responsive to determining that both the authentication data and the biometric data is valid.

According to another embodiment, the present disclosure also provides a system for creating access to a wireless communication device, wherein the system comprises the wireless communication device and a Body Area Network, BAN, enabled peripheral device paired with the wireless communication device. The wireless communication device comprises a Body Area Network, BAN, enabled access module, configured for creating access to the wireless communication device. The BAN enabled access module comprises a scanner for scanning a body part of a user and collecting biometric data of the body part, a BAN enabled electrode configured for receiving authentication data from the BAN enabled peripheral device. The Body Area Network, BAN, enabled peripheral device is configured for transmitting the authentication data upon request and comprises a sensor configured for detecting the presence of said user's body, a communication interface configured to communicate with the wireless communication device by using BAN, a memory circuit configured to store the authentication data and a processing circuitry. The processing circuitry is configured to store, in the memory circuit, the authentication data in the memory circuit as long as the sensor detects the presence of the user's body, and to transmit the authentication data to the BAN enabled access module, when a request for authentication data is received. The access is allowed to the wireless communication device if the collected biometric data and the received authentication data are valid.

In one embodiment, wherein the BAN enabled electrode is configured for controlling the scanner, the BAN enabled electrode comprises a detector configured for detecting the presence of said user's body and a processing circuitry. The processing circuitry is configured to send instructions to the scanner to start scanning and collecting the biometric data when the presence of the user's body is detected and to receive the authentication data from the peripheral device by using BAN when the presence of said user's body is detected.

In one embodiment, the processing of the BAN enabled electrode is further configured for sending a request for authentication data at the same time as the scanner starts collecting biometric data.

In one embodiment, the received authentication data and the collected biometric data are analysed and the wireless communication device is unlocked if the received authentication data and the collected biometric data are valid.

In one embodiment, the BAN access module is provided at one of a face portion of the wireless communication device.

According to another embodiment, the present disclosure also provides a Body Area Network, BAN, enabled access module associated with a wireless communication device, configured for allowing access to the wireless communication device. The BAN enabled access module comprises a scanner for scanning a body part of a user and collecting biometric data associated with the body part. The BAN enabled electrode comprises a detector for detecting the presence of the body part and a processing circuitry. The processing circuitry is configured to send instructions to the scanner to start scanning and collecting biometric data when the body part is detected and receive authentication data from a BAN enabled peripheral device by using BAN.

In one embodiment, the processing circuitry is configured to send a request for said authentication data to the BAN enabled peripheral device by using BAN.

In one embodiment, the processing circuitry is configured to transmitting said received authentication data to said communication device.

According to another embodiment, the present disclosure also provides a wireless communication device comprising a Body Area Network, BAN, enabled access module, configured for creating access to said wireless communication device. The BAN enabled access module comprises a scanner for scanning a body part of a user and collecting biometric data of the body part and a BAN enabled electrode. The BAN enabled electrode comprises a detector for detecting the presence of the body part and a processing circuitry. The processing circuitry is configured to send instructions to the scanner to start scanning and collecting biometric data when the body part is detected and to receive authentication data from a BAN enabled peripheral device by using BAN.

In one embodiment, the processing circuitry of the BAN enabled electrode is configured to send a request for the authentication data to the BAN enabled peripheral device by using BAN.

In one embodiment, the processing circuitry of the BAN enabled electrode is configured to transmitting the received authentication data to the communication device.

In one embodiment, the BAN access module is provided at one of a face portion of said wireless communication device.

In one embodiment, the wireless communication device comprises a communications interface circuit configured to communicate data and signals with a peripheral device disposed proximate to the wireless communication device and a processing circuitry. The processing circuitry is configured to determine whether both the wireless communication device and the peripheral device are in contact with a user's body and to pair the wireless communication device with the peripheral device using a BAN if both the wireless communication device and the peripheral device are in contact with the user's body.

In one embodiment, the processing circuitry is configured to pair the wireless communication device with the peripheral device using BAN, the processing circuitry is further configured to generate a key based on a unique identifier received over a first communication link from the peripheral device, to transmit the generated key to the peripheral device over the first communication link, to receive the key from the peripheral device over a second communication link and to pair said wireless communication device with the peripheral device if the key received over the second communication link is a valid key.

In one embodiment, the second communication link comprises a Body Area Network (BAN) link that uses the user's body as a transmission medium, and the processing circuitry is further configured to send a request to the peripheral device to ping the wireless communication device over the BAN link, to receive the ping from the peripheral device over the BAN link and to determine whether both the wireless communication device and the peripheral device are in contact with the user's body responsive to receiving the ping.

In one embodiment, the wireless communication device comprises a display, and wherein the processor circuit is configured to display a passcode lock screen by the display to the user and bypass the passcode lock screen responsive to determining that both the wireless communication device and the peripheral device are in contact with the user's body.

In one embodiment, the body part is one of a digit of a hand, a part of a digit of a hand, an eye, a palm of a hand or a part of a palm of a hand.

In one embodiment, the biometric data is any of a fingerprint, palm print or iris recognition.

The features of the above-mentioned embodiments can be combined in any combinations.

It is an advantage with the above-mentioned embodiments of the invention are that they may allow for speeding the unlocking or access procedure up significantly; just a touch and you are all set. The security level is improved by parallel systems, collecting biometric data through scanning together with receiving authentication data over BAN, for unlocking. BAN electronic circuits consume extremely little current in standby mode which opens for great freedom in accessory designs, small devices.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which:

FIG. 8A-F is perspective views illustrating different locations of the access module of the present disclosure.

DETAILED DESCRIPTION

Aspects of the present invention will be described more fully hereinafter with reference to the accompanying drawings. The devices and methods disclosed herein can, however, be realized in many different forms and should not be construed as limited to aspects set forth herein. Like reference signs refer to like elements throughout the text.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

As used herein, the term "communication device" includes portable communication device and portable radio communication equipment. Portable communication devices and mobile communication devices may be used synonymously. The term "communication device" may be referred to below as a mobile phone (or as a mobile telephone, portable phone or portable telephone), a portable device, a portable radio terminal or a portable terminal, includes all electronic equipment, including, but not limited to, capable of being used for voice and/or data communication.

As will be appreciated, the invention may be used with mobile phones, other phones, smartphones, personal digital assistants (PDAs), tablets, pads, computers and other communication devices, etc., for brevity, the invention will be described by way of examples with respect to mobile phones, but it will be appreciated that the invention may be used with other communication devices.

The present invention suggests a solution to improve the users access or unlock procedure to a mobile phone, tablet etc. and at a higher security level. The user is carrying a BAN enabled peripheral device, a BAN enabled accessory, either in the form of a wristband, smart-watch, small box for the pocket, ear-drop, necklace or alike. By simply touching the fingerprint sensor or scanner on the phone, tablet etc. the scanning process of the finger of the user is initiated. Integrated with the fingerprint scanner is a BAN electrode and simultaneous with the scanning a BAN communication is running in parallel by using the BAN electrode to send additional security key data between the BAN accessory and the phone, tablet, etc.

Figure 3:
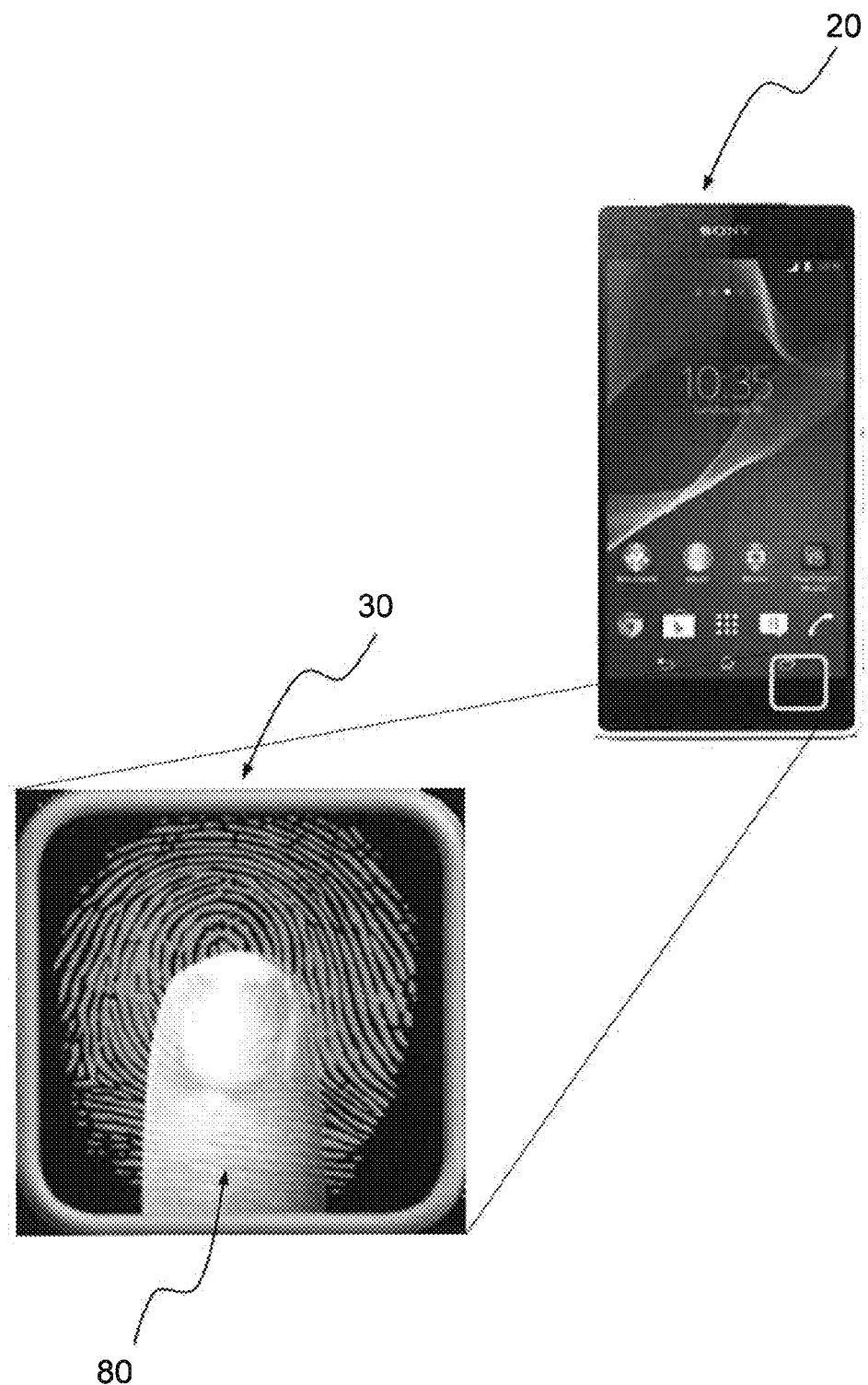
FIG. 3 is a perspective view illustrating one embodiment of the present disclosure.

In one embodiment, as shown in FIG. 3, the BAN electrode is provided around or under the scanner in the form of a yellow ring or just a metal bar. Even a "transparent" metal grid can constitute the BAN electrode.

The authentication data to be sent over BAN can either be a data package once and for all stored in the BAN accessory and once and for all paired with the communication device. This authorization data can however be stored differently into the BAN accessory in order to raise the security level further; for example an initializing procedure to take place prior to carrying a phone, tablet, etc. for example at each morning of use.

In one aspect, the user unlocks his phone by entering a numeric or gesture sweep code to the display. This code is sent over BAN to the accessory and stored there as long as the user carries the accessory on his/hers body. The code stored in the accessory will be deleted either immediately or with a certain delay once the accessory is removed from the users body by means of a capacitive sensor built into it or simply sensed over BAN that the accessory is away from the body.

By collocating a BAN-electrode with the fingerprint scanner touching area the fingerprint scanning procedure can automatically be initiated by means of a user carried accessory containing BAN electronic circuits and a battery. This BAN communication established between the accessory and phone, tablet, etc. will not only immediately wake up the fingerprint scanner for fingertip reading but also communicate a data sequence containing for example an unlock code which then comes in parallel to the finger signature information from the scanner and hence the security level is improved significantly. This might be required for financial transaction applications etc.

Figure 1:
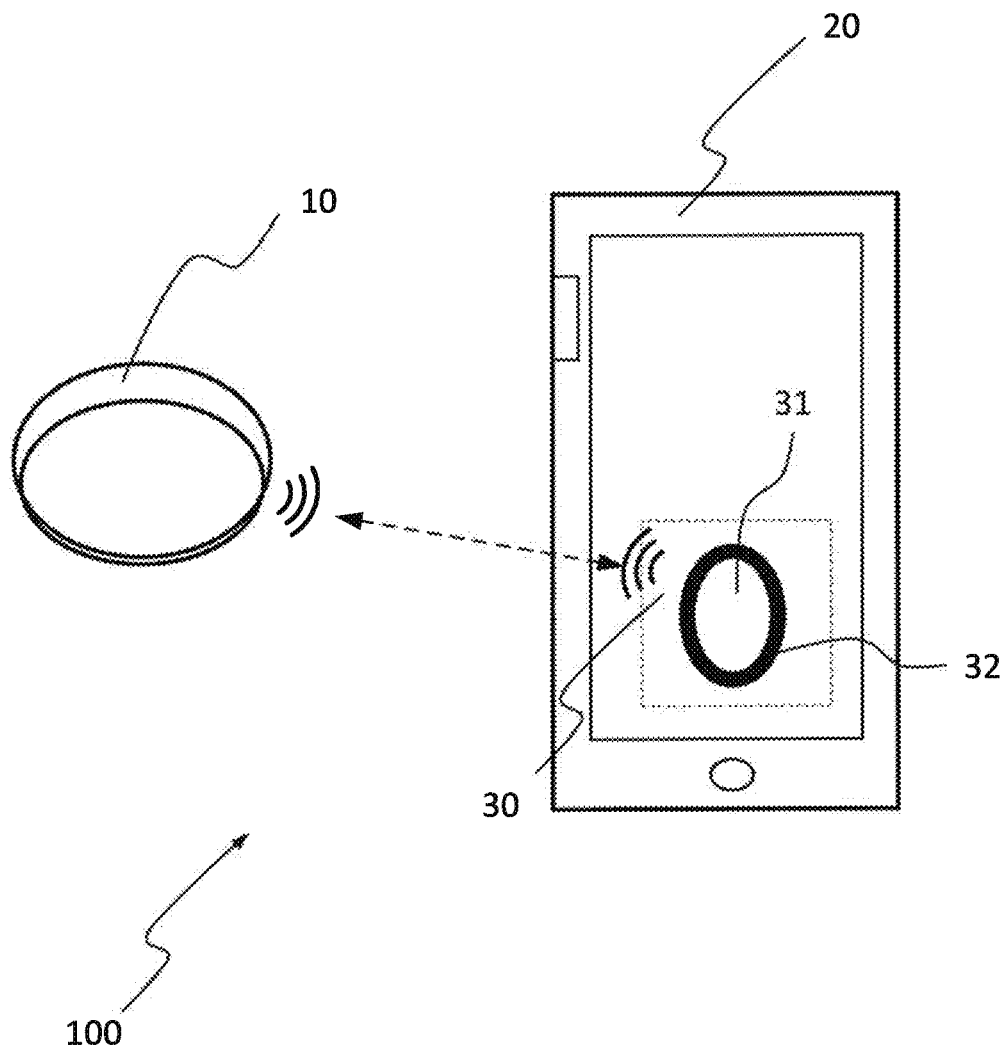
FIG. 1 discloses a view of a system comprising a peripheral device and a wireless device, according to the disclosure.

Referring in detail to the drawings, and initially to FIG. 1, a communication device in accordance with an embodiment of the present invention is illustrated generally at 20. The communication device 20 will be referred to below as a mobile phone. However, as was mentioned above, references to "mobile phones" include various other devices, such as, for example, those mentioned above. In outward appearance the mobile phone is of one type of design or style; however, the features of the invention, as are described in further detail below may be used in other types of mobile phones. The disclosure relates to the process for unlocking a mobile phone. This process could speed up the unlocking or access significantly. Just a touch and you are all set. The security level is also improved by parallel systems for unlocking.

The authentication data can be encrypted. The authentication data can be a random 128 bit hash code, which is set by the user.

Figure 4:
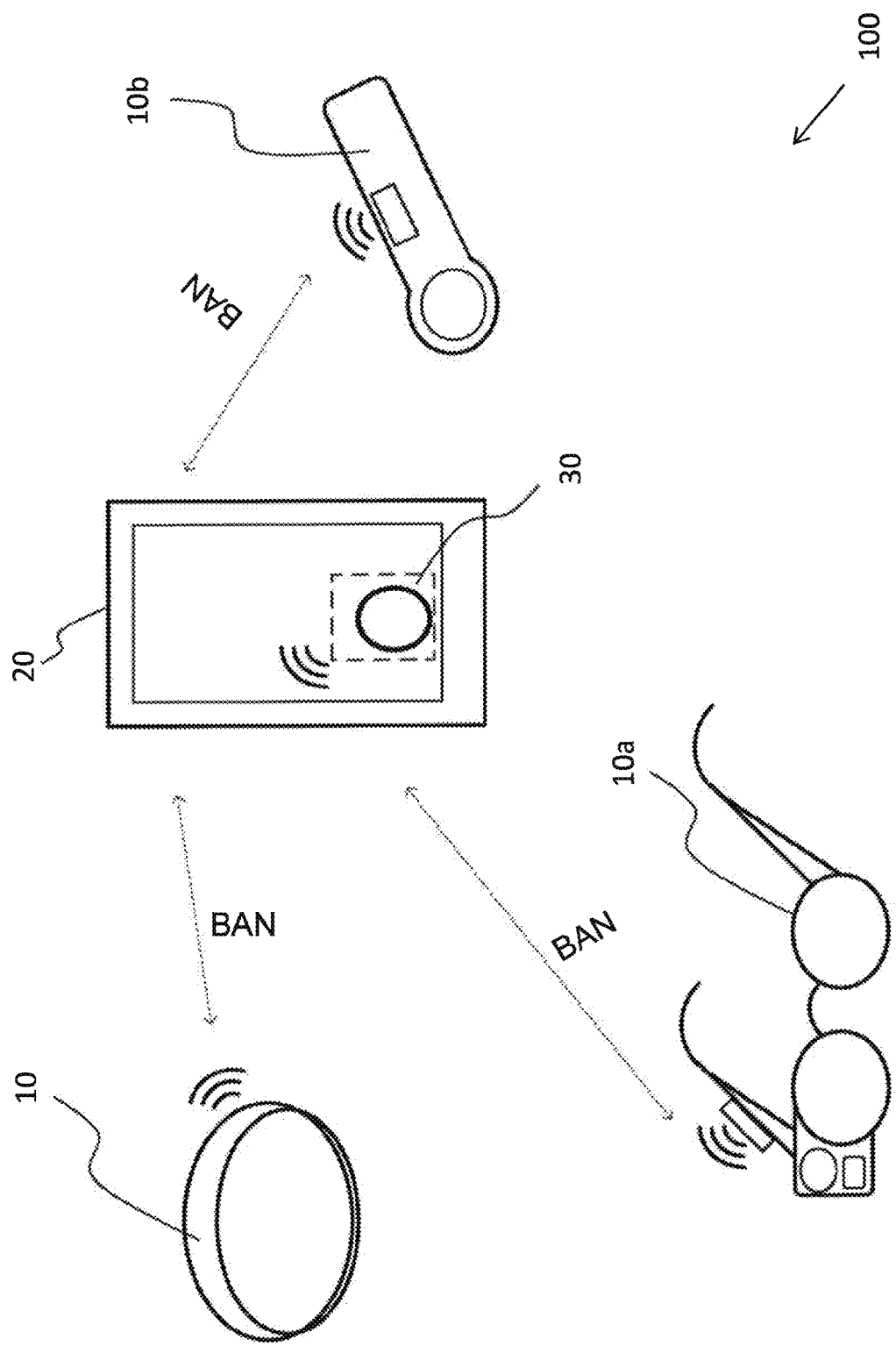
FIG. 4 is perspective views illustrating other types of peripheral devices configured to be BAN paired according to one or more embodiments of the present disclosure.

A peripheral device 10 in this application refers to a device configured to be worn by a person, such as a wristlet, a headset, goggles or a watch, as illustrated in FIG. 4.

In short, the disclosure provides for a peripheral device 10, i.e. a wristlet, and a method to implement a logon process with high security level for a communication device 20, i.e. a mobile phone, by using the peripheral device 10, i.e. wristlet.

Figure 2A:
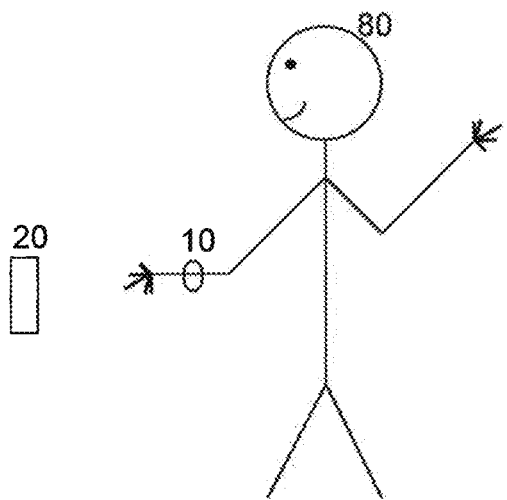
FIG. 2A-2B is perspective views illustrating BAN paired communication device and peripheral device, where the peripheral device is being used as a key according to embodiment of the present disclosure.
Figure 2B:
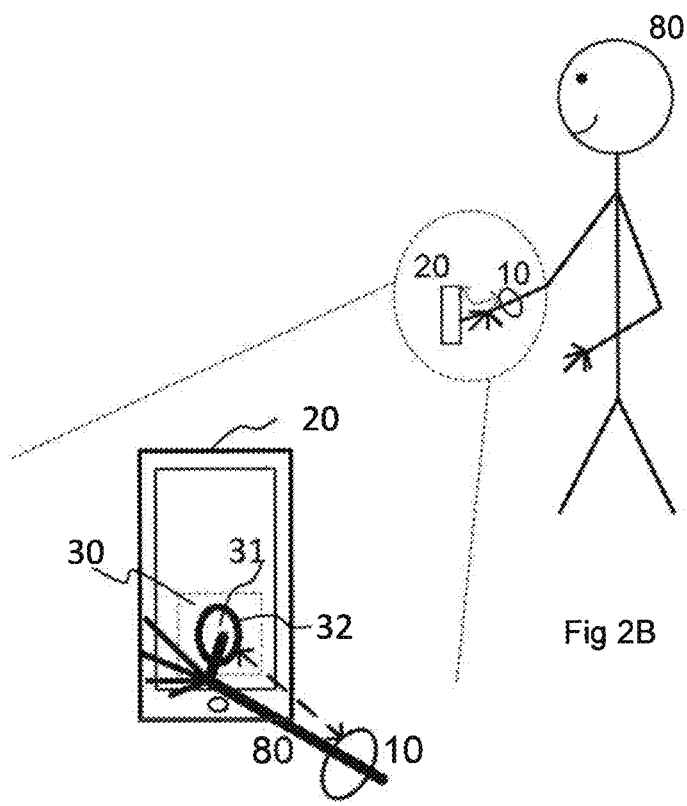

According to one example embodiment, as shown in FIG. 2A-2B the user puts on a wristlet 10 on a body part 80, such as on the arm. The user then locks the wristlet around the arm with a lock, i.e. a snap lock. The user uses his mobile phone 20 as he always does and he touches a login button or a screen lock button 30 provided with a scanner 31 and a BAN electrode 32, as also illustrated in FIG. 3, and enters his password to unlock the mobile phone. This password can be very long if the user wants a high security level, and this is not a problem since the user only needs to enter it once when keeping the wristlet on the arm. At the same time the scanner starts to scan the finger and collects biometric data. The next time the user wants to unlock his mobile phone he only has to touch the login button or a screen lock button 30 and the mobile phone opens without having to enter the password. When the user takes off the wristlet the connection between the wristlet 10 and the mobile phone 20 is lost and the next time the user wants to unlock or open his phone he has to enter the password as well.

Biometric data refers to metrics related to human characteristics and traits. Examples include, but are not limited to fingerprint, face recognition, DNA, palm print, hand geometry and iris recognition. A fingerprint is an impression left by friction ridges of one of a finger, a part of a finger, a palm or a part of a palm. A friction ridge is a raised portion of the epidermis on the digits, the palm of the hand, consisting of one or more connected ridge units of friction ridge skin.

Turning to the drawings, FIGS. 1, 2A and 2B are a perspective views of a system 100 configured according to one embodiment. As seen in FIG. 1, system 100 comprises a pair of wireless devices 10, 20 associated with a user. The two devices are configured to pair with one another, and in this embodiment, comprise a mobile phone 20, which may be held in the user's hand, as shown in FIG. 2B, and a wearable peripheral device 10, such as a wristlet, that may be worn around the wrist of the hand, which is shown in FIGS. 2A and 2B, that is holding the mobile phone 20. As will been described in more detail below, both the mobile phone 20 and the wristlet 10 comprise communication circuitry and corresponding software that enables the devices to establish communications links within, on, or in close proximity to the user's body, and to communicate the data and signals needed for pairing over those links.

More particularly, the mobile phone 20 and the wristlet 10 (collectively, "devices 10, 20") establish communications links between them that allow the devices 10, 20 to communicate signals and data. Although the communications links may comprise an air interface that is external to, but proximate, the user's body, at least one communication link utilizes the user's own body as a transmission medium to carry the signals and data between the devices 10, 20. Such links—i.e., those links that are within or on the user's body—are referred to herein as "Body Area Network" (BAN) communication links or BAN links.

Body Area Networks (BANs), which may also be referred to as a "Wireless Body Area Networks" (WBANs), is a technology that utilizes low-power sensor circuitry disposed in and on a user's body to provide real-time monitoring of the user. Conventionally, this technology has been utilized for the real-time health monitoring patients and diagnosing their conditions and illnesses (e.g., diabetes monitoring, and the like); however, in this disclosure, the ability to communicate using a BAN link is utilized to securely communicate the signals and data that are needed to pair the devices 10, 20. More particularly, the user's own body (e.g., the user's hand) functions as a "connector" between the two devices 10, 20. So-connected, the devices 10, 20 will be able to detect one another's presence, as well as to transmit and receive tokens used in their pairing.

For the interested reader, BANs are fully described in the IEEE standard P802.15.6/D01 entitled, "Wireless Medium Access Control (MAC) and Physical Layer (PHY) Specifications for Wireless Personal Area Networks (WPANs) Used in or Around a Body." That standard, which was published in May, 2010, is incorporated herein for reference in its entirety.

FIG. 1 show the electronic device, e.g. the mobile phone 20, which now will be described in further detail. The mobile phone 20 comprises a controller, CTL, or a processing circuitry that may be constituted by any suitable Central Processing Unit, CPU, microcontroller, Digital Signal Processor, DPS, etc. capable of executing computer program code for executing the method disclosed. However, the method may as well be hardware implemented or a combination of hardware and software. The computer program may be stored in a memory, MEM. The memory can be any combination of a Read And write Memory, RAM, and a Read Only Memory, ROM. The memory may also comprise persistent storage, which, for example, can be any single one or combination of magnetic memory, optical memory, or solid state memory or even remotely mounted memory.

The mobile phone 20 further comprises a wireless communication interface (i/f) 32 arranged for wireless communication with cellular communication system and/or other wireless communication systems. The wireless communication interface 32 may be adapted to communicate over one or several radio access technologies. If several technologies are supported, the access point typically comprises several communication interfaces, e.g. one WLAN communication interface and one cellular communication interface. The communication interface is e.g. adapted to download a computer program for executing the proposed methods or access a data base comprising device specific information.

The wearable peripheral device 10, as shown in FIGS. 1 and 2A-2B, which will be described in further detail, is configured for temporarily storing authentication data associated with at least one wireless electronic device 20, where the method is implemented. The wearable peripheral device 10 is configured to be wearable, thus it can be worn on a part of the human body of the user, such as on or around a wrist, arm or neck, as long as it is in close contact, preferable within a range of 20-30 mm, with the skin of the human body. The wearable peripheral device can be designed as a wristband, wristlet, bracelet, bangle, necklace, collar, a ring, goggles, a headset, a watch or the like. The wearable peripheral device 10 can also be attached onto the skin of the user, such as a patch or any adhesive or sticking piece of paper or plastic. The wearable peripheral device 10 may also be attached to the clothes worn by the user. However, for the sake of clarity and simplicity, most embodiments outlined in this specification are related to a wristlet 10.

FIG. 9 is a block diagram illustrating some of the components of the two devices that are comprised in the system 100—i.e., the mobile phone 20 and the wristlet 10. The mobile phone 20 comprises a processor circuit 22, a BAN communications interface circuit 24, a memory 30, a communications interface circuit 32, and a User Input/output interface 36.

Processor circuit 22 comprises an electronics circuit configured to generally control the operation of the mobile phone 20 according to programs and data stored in memory 30.

Such programs and data include, but are not limited to, logic and instructions that, when executed by the processor circuit 22, control the establishment of BAN link 14 and air interface link 16. The programs and data may also configure the processing circuit 22 to generate the unique keys from the identifiers sent by the wristlet 10, whether and how the mobile phone 20 pairs with the wristlet 10, and how the mobile phone 20 can enable and/or disable the transmitter(s) at wristlet 20. Processing circuit 22 may be implemented, for example, in a single microprocessor, or in multiple microprocessors. Suitable microprocessors may include general purpose and special purpose microprocessors, as well as digital signal processors.

The BAN communications interface circuit 24 comprises a first BAN interface circuit 26 and a second BAN interface circuit 28. Each of these circuits 26, 28 may comprise, for example, a transmitter, a receiver, or both (i.e., a transceiver) controlled to communicate with a corresponding circuit 46, 48 at the wristlet 10. In one embodiment, both circuits 26, 28 are configured to transmit signals and data using the user's own body as a transmission medium.

In other embodiments, one of the circuits 24, 26 comprises an NFC transmitter/receiver (or a transmitter/receiver operating according to some other protocol such as BLUETOOTH), for example, while the other of two circuits 26, 28 comprises a transmitter/receiver that communicates signals and data via the BAN link 14 within or on the user's body.

Memory circuit 30 is a computer readable medium representing the entire hierarchy of memory in, or accessible to, mobile phone 20. Memory 30 may comprise both random access memory (RAM) and read-only memory (ROM), and may be implemented, for example, as one or more discrete devices, stacked devices, or removable devices, such as a flash drive or memory stick. In one embodiment, the memory 30 may be integrated with processor circuit 22. As previously stated, memory circuit 30 may store programs 36 responsible for controlling the operation of mobile phone 20, as well as the unique identifiers received from wristlet 10 and the unique keys generated based on those unique identifiers.

The communications interface circuit 32 may comprise any transceiver for transmitting and receiving data, such as downloaded video and/or audio content, for example, to and from a base station in a wireless communications network. Thus, in one embodiment, the communications interface circuit 32 comprises a fully functional cellular radio transceiver that operates according to any known standard. Such standards include, but are not limited to, the Global System for Mobile Communications (GSM), TIA/EIA-136, cdmaOne, cdma2000, UMTS, WiFi, and Wideband CDMA.

The User I/O interface 34 provides a user with the necessary components to interact with the mobile phone 20. Typically, the UI 34 includes a display, a speaker, a microphone, and a variety of controls, which may include, but is not limited to, a keypad or buttons. In one embodiment, the processing circuit 22 controls the UI 34 to display a prompt to the user to indicate whether the user wishes to pair the mobile phone 20 to wristlet 10.

The wristlet 10 also comprises a variety of components including, but not limited to, a processor circuit 42, a BAN communications interface circuit 44, a memory circuit 50, and a sensor 52. The processor circuit 42 may also comprise an electronics circuit configured to generally control the operation of the wristlet 10 according to programs and data stored in memory 50. Such programs and data include, but are not limited to, logic and instructions that, when executed by the processor circuit 42, control the establishment of BAN link 14 or air interface link 16. The programs and data may also configure the processing circuit 42 to retrieve and send the unique identifier (e.g., the hardware identifier of wristlet 10) to the mobile phone 20, as well as to store the key generated by the mobile phone 20 in memory 50, and send the key to the mobile phone 20 via BAN link 14 or air interface link 16. As above, the processing circuit 42 may be implemented, for example, in a single microprocessor, or in multiple microprocessors. Suitable microprocessors may include general purpose and special purpose microprocessors, as well as digital signal processors.

The BAN communications interface 44 also comprises a pair of BAN interface circuits 46, 48. Like circuits 26, 28 in cellular telephone 20, one or both of the BAN interface circuits 46, 48 may comprise, for example, a transmitter, a receiver, or both (i.e., a transceiver).

Further, the circuits 46, 48 may be controlled to communicate with the corresponding circuits 26, 28 at the mobile phone 20. In one embodiment, both circuits 46, 48 are configured to transmit signals and data using the user's own body as a transmission medium. In other embodiments, however, one of the circuits 46, 48 comprises an NFC transmitter/receiver (or a transmitter/receiver operating according to some other protocol such as BLUETOOTH or Wi-Fi), for example, while the other of the two circuits 46, 48 comprises a transmitter/receiver that communicates signals and data via the BAN link 14 within or on the user's body. Memory circuit 50 is a computer readable medium representing the entire hierarchy of memory in, or accessible to, wristlet 10. Memory 50 may comprise both random access memory (RAM) and read-only memory (ROM), and may be implemented, for example, as one or more discrete devices, stacked devices, or removable devices, such as a flash drive or memory stick. In one embodiment, the memory 50 may be integrated with processor circuit 42.

As previously stated, memory circuit 50 may store the logic and instructions responsible for controlling the operation of wristlet 10, as well as for storing the unique keys generated based on the unique identifiers associated with wristlet 10.

Figure 5:
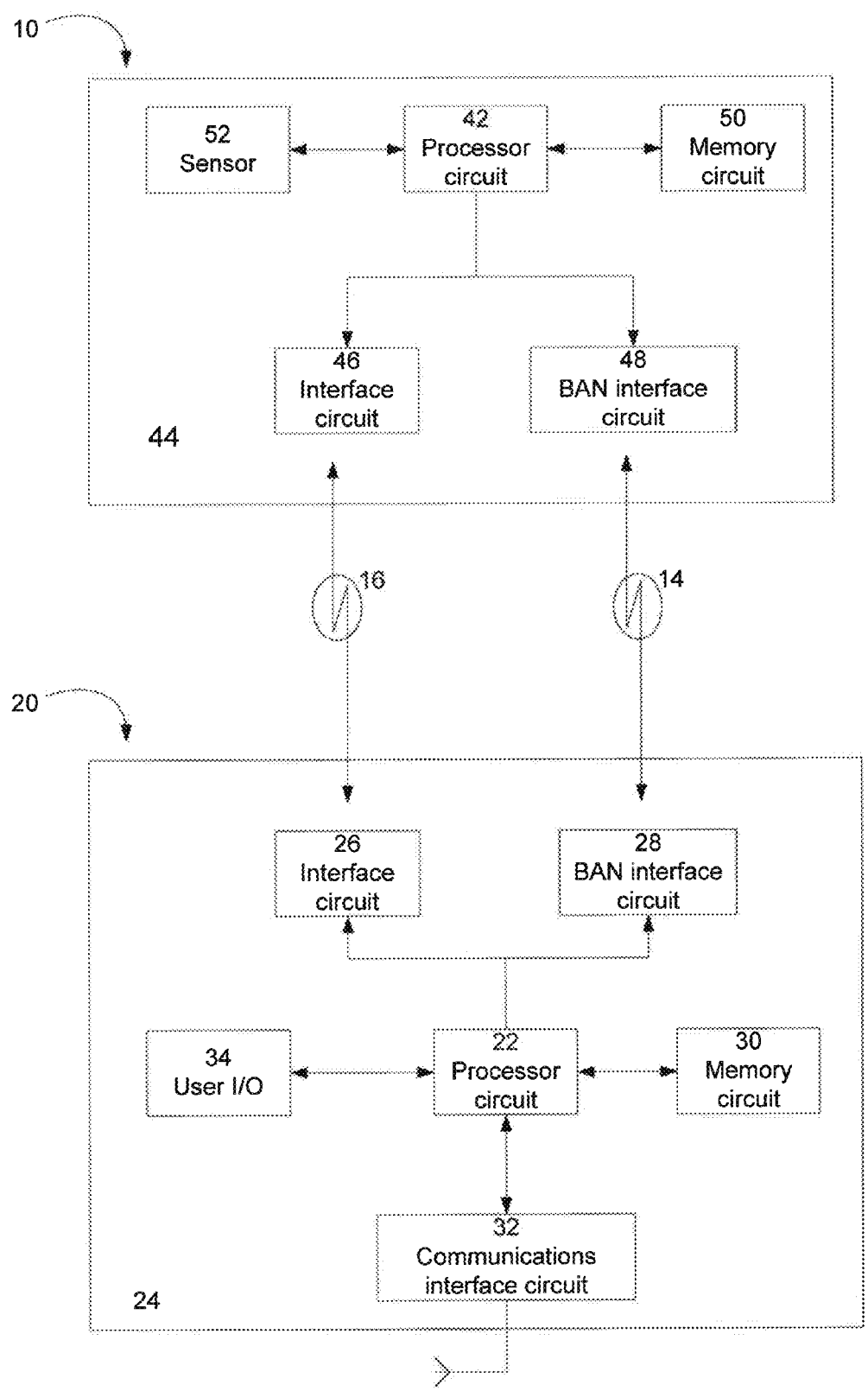
FIG. 5 is a block diagram illustrating some component circuits comprised in two wireless devices configured to be BAN paired according to one embodiment.

The sensor 52 can be any sensor known in the art configured to detect when the wristlet is secured to the user's wrist. In one embodiment, such a sensor may comprise a "tremor sensor" configured to detect the tremors present in human muscles. As stated previously, such sensors are able to sense tremors within the 8-12 Hz range. However, other sensors are also possible, such as those that are configured to detect body temperature, blood flow, and pulse, for example. As stated above, signals coming from sensor 52 may be received at the processor circuit 42, and used as a trigger to activate one or both of the BAN interface circuits 46, 48 and establish BAN link 14 and/or 16. The wristlet comprises an electronic module 44, as shown in FIG. 5, configured for temporarily storing authentication data associated with at least one electronic device 20, where the method is implemented. The electronic module 44 comprises a detector unit 52 configured to detect the presence of a human body. The detector 52 can be a sensor of any kind such as an accelerator, optical sensor, temperature sensor, pulse sensor or the like. The detector 42 can be provided on the back of the wristlet, which is on the part of the wristlet that is closest to the body part of the user, where the wristlet 10 is provided.

In one embodiment the detector 52 comprises a capacitive touch system. The capacitive touch system is placed on the back of the wristlet 10. The capacitive touch system has low power consumption, which is less than 30 Micro Amp, when the wristlet is on a body part as well as of a body part. The sensitivity range may be set to the range of 20-30 mm, such that the wristlet 10 may be loosely coupled around a body part, such as an arm, and still give a signal. The capacitive sensor system is always active.

As soon as the wristlet 10 is placed on a part of the human body of the user, such as around the arm or wrist, the detector unit 52 starts to sense the presence of a human body.

The detector 52 may comprises an accelerometer, which can detect a tremor signal from the user. A tremor signal is a signal measuring the human quiver or tremble movement and it is always present in human muscles at a frequency of 8-12 Hz. In one aspect, the detector unit 10 may comprises a pulse sensor, which can detect the heart rate or blood pulse of the user, and/or an optical sensor, which can detect the blood flow of the user.

The electronic module 44 further comprises a controller 42. The controller is configured to execute the method according to the disclosure. The controller 42 is typically a processing circuitry configured for executing computer code, such as a computer program implementing the proposed method. One example is that the computer code is an application, which may be downloaded from an external server. However, the method may as well be hardware implemented or a combination of hardware and software. The controller 42 is configured for indicating an ability to temporarily store authentication data, when the detector 52 detects the presence of a human body.

The electronic module 44 further comprises a communication interface 46, 48 configured to communicate with at least one electronic device 20 by using BAN. The controller 42 is configured to receive and transmit authorization data from the electronic device 20 by using the communication interface 46, 48.

The electronic module 44 further comprises a data storage 50 configured to store the authorization data or credential data. The controller 42 is configured to store, in the data storage 50, the received credentials as long as the detector 52 detects the presence of a human body and to transmit the authorization data or credential data to the electronic device 20, when a request for authentication data is received. The controller 42 is further configured to remove the authorization data or credential data from the storage 50 when the presence of a human body is no longer detected.

In one embodiment, the detector 52 comprises a capacitive touch system and an accelerometer. When the wristlet 10 is placed on an arm the capacitive touch system will send an interrupt signal to the controller 42 comprised in the electronic module 44, informing the controller 42 that the wristlet 10 is placed on an arm, or something with a similar capacitance as an arm. Then the accelerator starts to detect a tremor signal. If the tremor signal is found, it is concluded that the wristlet is put on an arm. The capacitive touch system is always active and when the system detects that the signal is lost it will send an interrupt signal to the electronic module 44.

FIG. 1 also shows a perspective view of a BAN enabled access module 30 configured according to one embodiment. The BAN enabled access module 30 is associated with one of the wireless device 20, e.g. the mobile phone, and configured for allowing access to the mobile phone. The access module 30 comprises a scanner 31 for scanning a body part of a user and for collecting biometric data associated with the body part and a BAN enabled electrode 32. The BAN enabled electrode 32 comprises a detector, not shown for detecting the presence of the body part and a processing circuitry, not shown. The processing circuitry is configured to send instructions to the scanner to start scanning and collecting biometric data when the body part is detected and to receive authentication data from the wearable peripheral device 10, e.g. the wristlet, by using BAN.

The body part may be one of a digit of a hand, such as a finger or a thumb, a part of a digit of a hand, such as a fingertip, a thumb tip, part of a finger or part of a thumb. A body part may also be an eye, a palm of a hand or a part of a palm of a hand.

In one embodiment, the wireless communication device 20, e.g. mobile phone comprises the Body Area Network, BAN, enabled access module 30, configured for creating access to the mobile phone. In one aspect the access module 30 comprises a scanner 31 for scanning a body part of the user and collecting biometric data of the body part and a BAN enabled electrode 32 configured for receiving authentication data from the BAN enabled peripheral device 10. The wristlet 10 is configured for transmitting authentication data upon request and comprises a detector 1 configured for detecting the presence of a user's body, a communication interface 2 configured to communicate with the mobile phone 20 by using BAN, a data storage configured to store authentication data and a processing circuitry 3. In one aspect the processing circuitry is configured to store, in the data storage 5, authentication data in the data storage as long as the detector unit 10 detects the presence of a user's body, and to transmit authentication data to the BAN enabled access module 30, when a request for authentication data is received. Further, access is allowed to the mobile phone 20 if the collected biometric data and the received authentication data is valid.

In one embodiment the BAN enabled electrode 32 is further configured for controlling the scanner 31 and comprises a detector, not shown, configured for detecting the presence of a user's body and a processing circuitry, not shown. The processing circuitry is configured to send instructions to the scanner to start scanning and collecting biometric data when the presence of the user's body is detected and receive authentication data from the wristlet 10 by using BAN when the presence of a human body is detected.

In one aspect, the processing circuitry of the BAN enabled electrode 32 is further configured to send a request for authentication data at the same time as the scanner starts collecting biometric data.

In one embodiment, the received authentication data and the collected biometric data are analysed and the mobile phone 20 is unlocked if the received authentication data and the collected biometric data is valid.

The access module 20 may be provided on the wireless communication device 30 at different places, which is shown in FIG. 8A-8D. The access module may be placed anywhere on the front side 20a of the mobile phone 20 or anywhere on the back side 20b of the mobile phone 20. In one aspect the access module may be placed anywhere on any of the long sides 20c, 20d of the mobile phone 20. In one aspect the access module may be placed anywhere on any of the short sides 20e, 20f of the mobile phone 20.

Figure 6A:
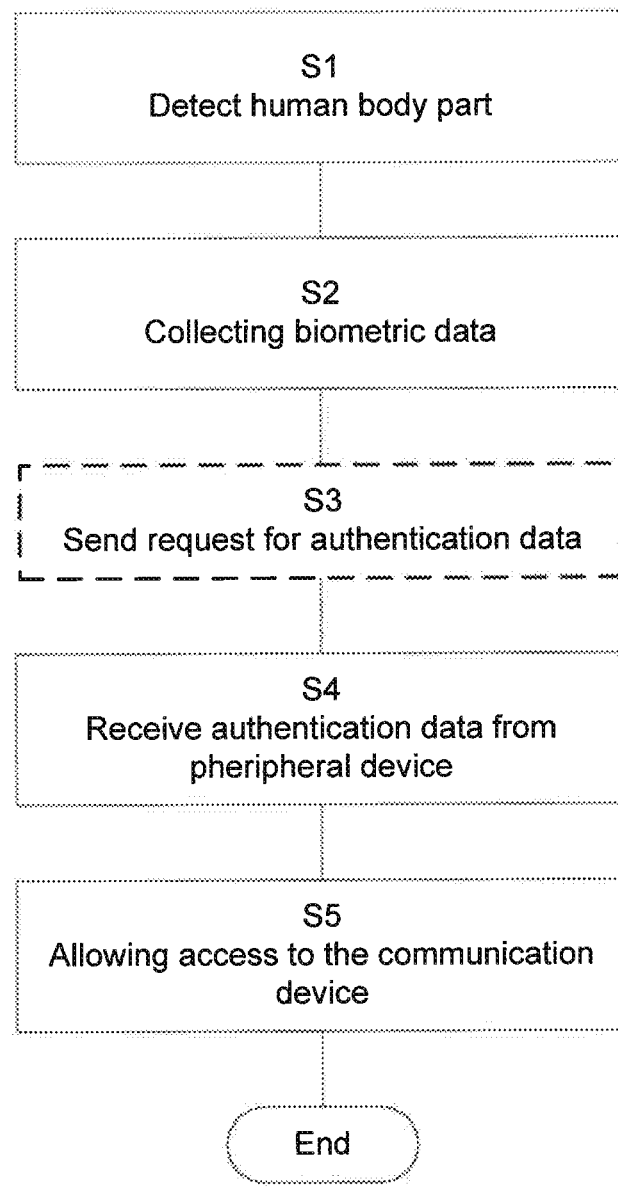
FIG. 6A-C discloses a flow chart of the method performed in a wireless device according to the disclosure.

The method will now be described starting from FIG. 6A disclosing method steps, performed in a BAN enabled communication device, e.g. a BAN enabled mobile phone 20. When the described steps are not dependent on each other, these steps may be implemented in any combination.

In the first step the communication device 20, e.g. mobile phone, detects S1 the presence of a user's body by using a BAN enabled electronic module 30 connected to the mobile phone 20, thus the user wants to unlock the mobile phone 2 by touching the power on button on the mobile phone 20.

In the second step the mobile phone 20 collects S2 a biometric data of a body part of the user by using a scanner 31 comprised in the BAN enabled electronic module 30.

In the third step the mobile phone 20 receives S4 authentication data by using the BAN enabled electronic module 30 through BAN from a BAN enabled peripheral device 10. As an example, the mobile phone receives a password via the BAN electrode from a wristlet by using the body of the user as a communication channel, thus receiving authentication data by using BAN. The wristlet is paired with the mobile phone and stores the password as long as the wristlet is worn by the user. The peripheral device 10 may also be a watch, ring, goggles, headset or any other accessory worn by the user.

In the fourth step the mobile phone 20 allows access S5 to the mobile phone 20 if the collected biometric data and the received authentication data are valid, thus the mobile phone is unlocked or opened.

Figure 6B:
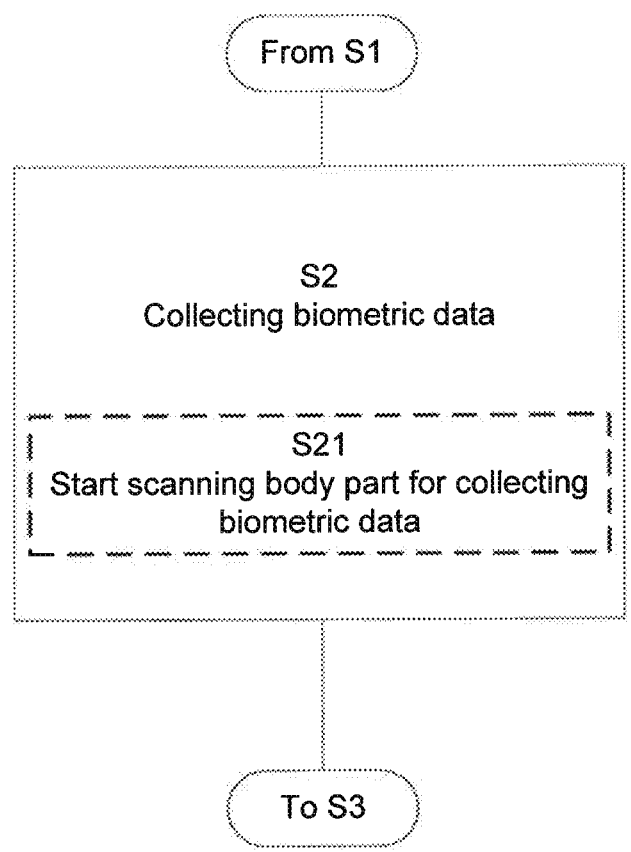
Figure 6C:
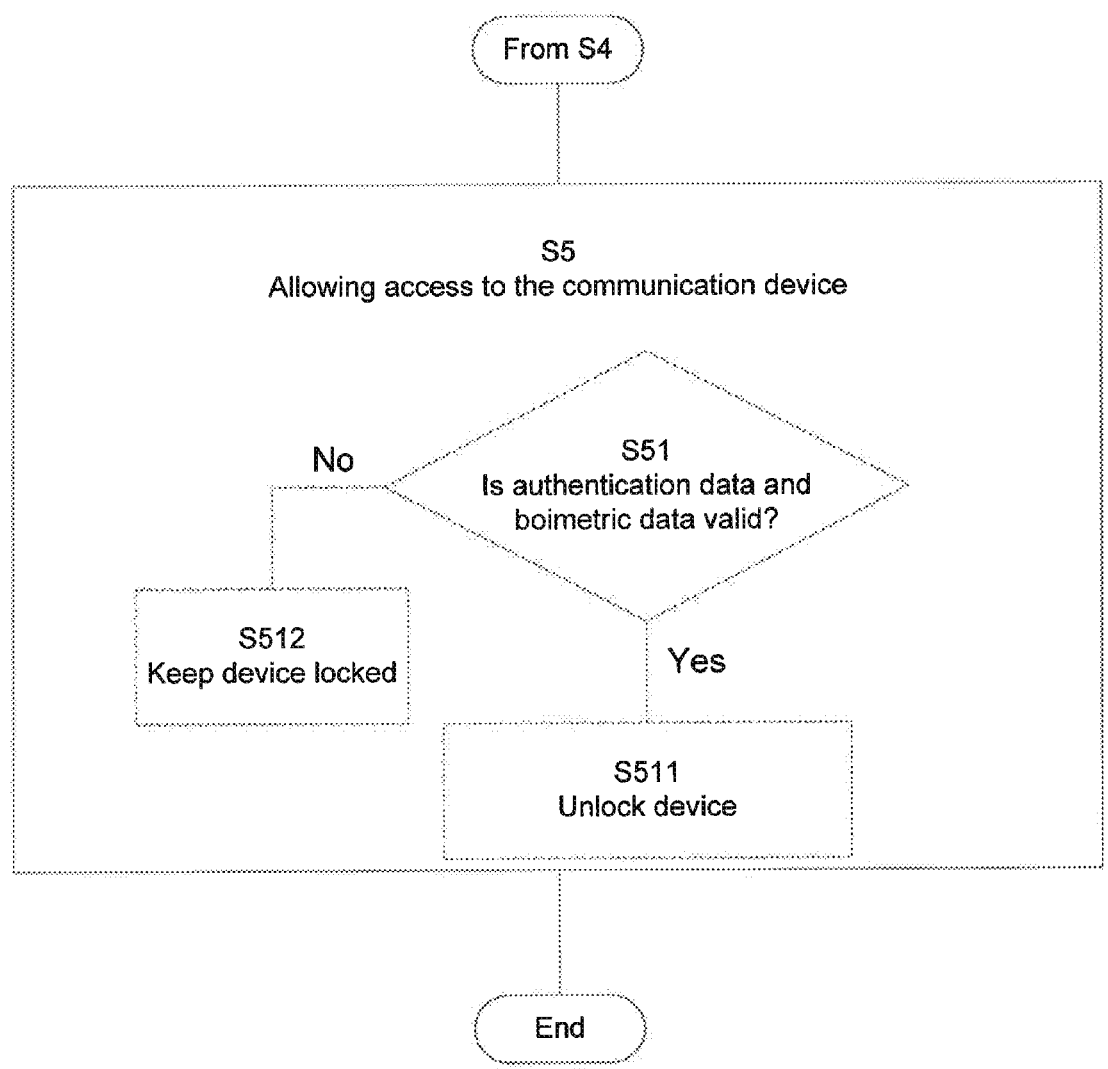

FIGS. 6B and 6C discloses exemplary embodiments showing further variants and how the different steps of the method may be implemented in more detail. When the described aspects are not dependent on each other, these variants may be implemented in any combination.

According to one aspect the step of collecting biometric data S2 further comprises starting S21 the scanner 31 when detecting the body part on the scanner and collecting biometric data by scanning the body part. As an example, when the user puts a fingertip on the power on button, a scanner starts to scan the fingertip, a part of a fingertip, a thumb etc. and collects biometric data, such as a fingerprint, pattern or trait of the fingertip.

In one embodiment, when the user wears the wristlet and pushes the power button on the mobile phone, there is no password needed, since it is sent from the wristlet. When it is concluded that the wristlet is on a body part of the user, such as an arm, BT low energy is turned on for broadcast. When the user unlocks the mobile phone, the broadcasted low energy signal will be detected. If the wristlet is close enough, e.g. within a distance of 30 cm, the mobile phone will send a request for the key, e.g. credential data. The key are then transferred to the mobile phone 20 and then the mobile phone 20 is unlocked. If there are no key in the wristlet, which is the case the first time the user logon to the mobile phone after putting on the wristlet, the mobile phone will request a key from the user, with UI 24 on the screen of the mobile phone, asking for a key and asking if the user wants to transfer a key to the wristlet or not.

According to one aspect of the step of receiving authentication data or credential data from the input device 24, the steps further comprises entering a fingerprint on the scanner 31 comprised in the access module 30. This disclosure then proposes to store the entered authentication data and fingerprint in the mobile phone 20, such that the user will not need to reenter them the next time he or she wishes to unlock the mobile phone 20.

In one embodiment, provided that the user has accepted or permitted sending a key, e.g. authentication data, to the peripheral device 10, the user will be notified once the key has been successfully transferred. When the user has accept sending the key to the peripheral device 10 the peripheral device 10 and the mobile phone 20 will pair by using Bluetooth paring, BT pairing. This is done in the background, automatically without interference by the user. When the pairing is done, the key is sent from the mobile phone to the peripheral device 10.

In one embodiment the method for creating access to the mobile phone 20 further comprises the step of sending S3 a request for authentication data at the same time as the scanner starts S21 collecting biometric data.

According to one aspect the step of allowing access S5 further comprises analysing S51 if the received authentication data and the collected biometric data is valid and unlocking S511 the mobile phone 20 if the received authentication data and the collected biometric data is valid.

Figure 7A:
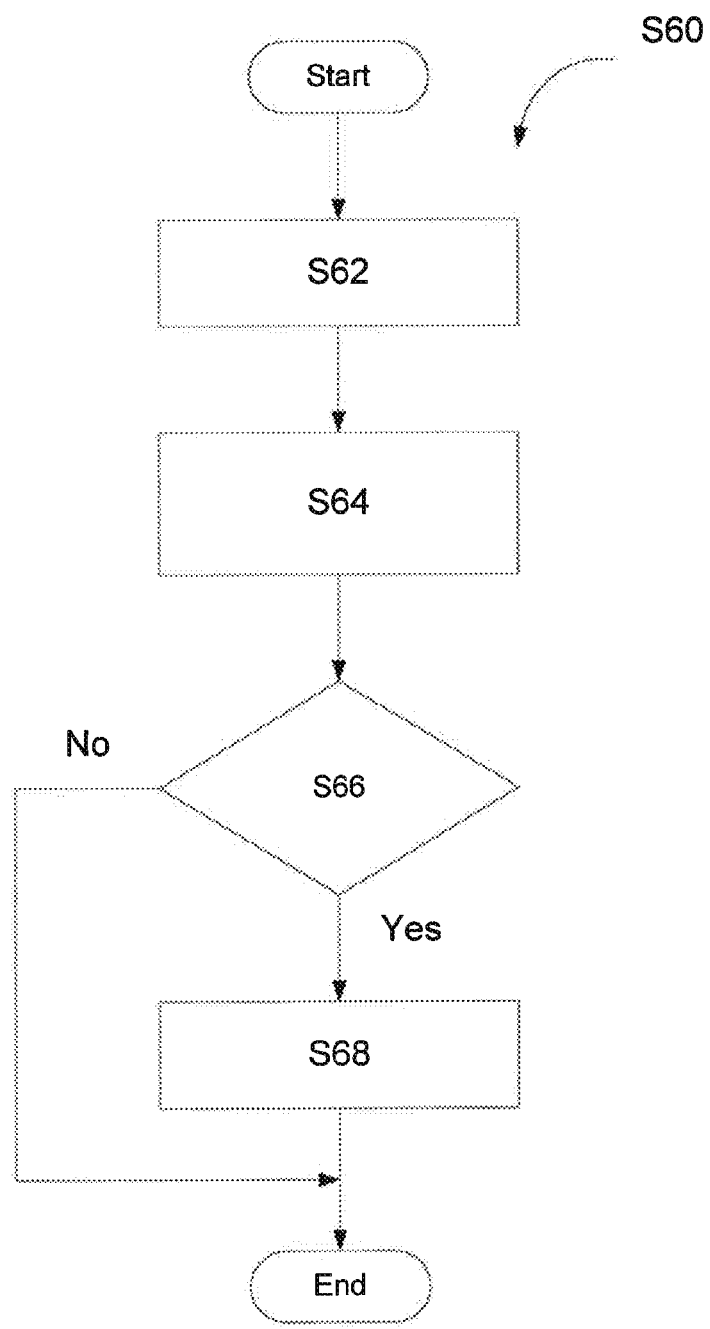
FIG. 7A-D is a flow diagram illustrating a method for BAN pairing two wireless devices according to an embodiment of the present disclosure.

FIG. 7A illustrates a method S60 by which the mobile phone 20 and the wristlet 10 seen in FIGS. 1, 2A and 2B are configured to BAN pair with each other according to one embodiment. Method S60 begins with the mobile phone 20 and the wristlet 10 detecting each other as being proximate to each other S62, such as at a distance of 1-2 cm or less. Such detection methods are well-known in the art of local connectivity, and as such, are not described in detail here. Once the two devices 10, 20 detect each other, one or both of the devices 10, 20 determine whether the other of the devices 10, 20 is currently in contact with the body of the same user S64. If it is determined that both devices 10, 20 are not currently in contact with the body of the same user S66, the method ends. If it is determined that both devices 10, 20 are currently in contact with the body of the user (e.g., the user that is wearing the wristlet 10 is also holding the mobile phone 20 in his or her hand) S66, the devices 10, 20 will BAN pair with each other S68.

In one aspect the step of pairing S68 comprises generating a key based on a unique identifier received over a first communication link 16 from the wristlet 10, transmitting the generated key to the wristlet 10 over the first communication link 16, receiving the key from the wristlet 10 over a second communication link 14 and pairing with the wristlet 10 if the key received over the second communication link 14 is a valid key.

In one embodiment of the method the mobile phone 20 is configured to display a passcode lock screen to the user, and further comprising bypassing the passcode lock screen responsive to determining that both the authentication data and the biometric data is valid.

The present disclosure also provides a method for pairing the mobile phone 20 with the wristlet 10 however, as those of ordinary skill in the art will appreciate; other methods not specifically described herein are also possible. Further, all methods employ bi-directional communications between the wristlet 10 and the mobile phone 20. For example, as shown in FIG. 1, the devices 10, 20 employ the user's body as a transmission medium for only one of the communication links, and another wireless technology (e.g., BLUETOOTH/BLE, Wi-Fi, NFC, etc.) as a transmission medium for the other link. In such cases, the wristlet 10 may represent a BAN transmitter, while the mobile phone 20 represents a BAN receiver. Only certain signals and data might be transmitted through the user's own body via a BAN communications link 14, while other signals and data are transmitted externally to, but proximate, the user's body via an air interface link 16. However in other embodiments, the devices 10, 20 employ the user's body as the transmission medium for two-way communications. Thus, BAN link 14 may, in some embodiments, comprise a bi-directional BAN link.

Figure 7B:
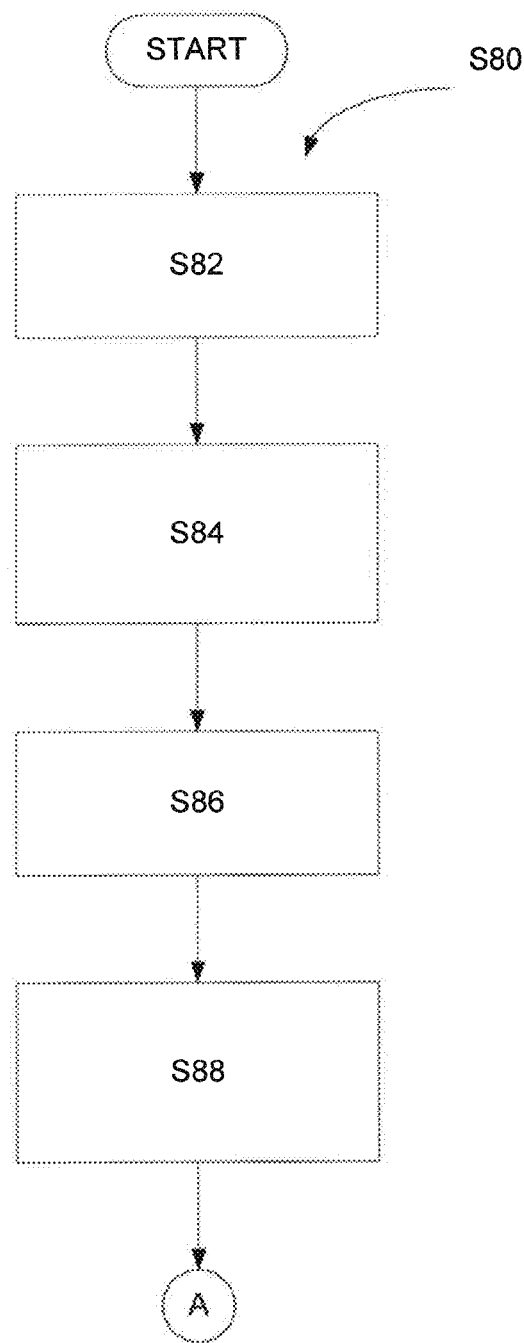

FIG. 7B illustrates a method S80 for BAN pairing the two devices 10, 20 in greater detail. Method S90 begins with the user placing the wristlet 10 onto his/her wrist. In one embodiment, the wristlet 10 is configured to self-detect when it is secured to the user's wrist, and in response, activate its Near Field Communications (NFC) transceiver S82. Such self-detection for the wristlet 10 is described, for example, in U.S. Application Ser. No. 61/912,223 entitled "A Wearable Device and a Method for Storing Credentials Associated with at least One Electronic Device" and in U.S. Application Ser. No. 61/942,753 entitled "Pairing consumer electronic devices using a cross-body communication protocol". The '223 application was filed on Dec. 5, 2013, and the '753 was filed on Feb. 21, 2014, and they are both incorporated herein by reference in their entirety.

By way of example, the wristlet 10 may comprise a sensor that contacts the user's skin when the wristlet 10 is placed on the user's wrist. Since it may be difficult to distinguish whether the wristlet 10 is on the user's wrist or on some other part of the user's body, the sensor may comprise a component configured to detect tremors in the user's body. Particularly, human muscles have a tremor commonly referred to as "the 8-12 Hz component." Therefore, the sensor utilized for wristlet 10 may comprise an accelerometer configured to detect such tremors within this frequency range. Note, however, that the wristlet 10 is not limited to the use of accelerometers for the sensor. Rather, other methods of self-detection are also possible. For example, wristlets 10 in other embodiments of the present disclosure utilize sensors configured to detect the user's pulse, blood flow, temperature, and the like.

Once the wristlet 10 activates its NFC transceiver, a corresponding NFC transceiver at the mobile phone 20 can establish an NFC link (i.e., air interface link 16) with the NFC transceiver at wristlet 10. Particularly, the user may place the mobile phone 20 within close proximity of the wristlet 10 (e.g., within a few millimeters distance) to tag the wristlet S84.

Tagging the wristlet 10 "BT/BLE pairs" the devices 10, 20—that is, the tagging causes the two devices 10, 20 to pair with each other over the air interface link 16, as opposed to BAN pairing which occurs over the BAN link 14.

Once the devices 10, 20 are BT/BLE paired and the air interface link 16 is established, the cellular telephone 20 can determine whether the wristlet 10 is also in contact with the same user's body. In this embodiment, the cellular telephone 20 sends a request to the wristlet 10 over the air interface link 16 requesting that the wristlet 10 indicate its BAN capabilities, if any, to the cellular telephone 20 S86, to which the wristlet 10 responds S88.

Figure 7C:
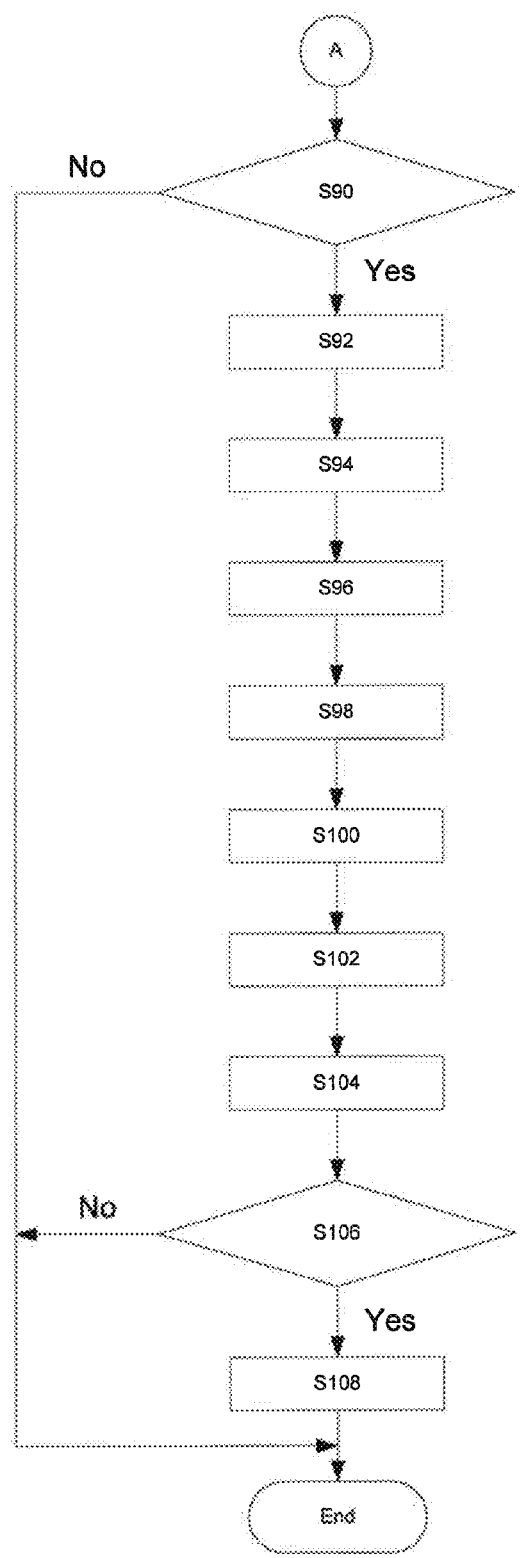

As seen in FIG. 7C, if the wristlet 10 indicates that it is not capable of BAN communications S90, the method S80 ends. However, if the wristlet 10 indicates S90 that it is capable of communicating with the cellular telephone 20 over the user's body (i.e., using the BAN link 14), the mobile phone 20 sends an activation request to the wristlet 10 via the air interface link 16 requesting that the wristlet 10 activate its BAN transceiver S92.

The mobile phone 20 then sends another request to the wristlet 10, again via the air interface link 16, requesting that the wristlet 10 provide the mobile phone 20 with a unique identifier S94. The mobile phone 20 may then activate its own BAN receiver. Upon receipt of the request, wristlet 10 obtains a unique identifier from its memory, for example, and sends that identifier to the mobile phone 20 over the BAN link 16 S96. The unique identifier sent by the wristlet 10 may be any unique indicator needed or desired. However, in one embodiment, the unique identifier comprises a hardware identifier for the wristlet 10.

Upon receiving the unique identifier from wristlet 10, mobile phone 20 uses the identifier to generate a unique key that will be shared between the mobile phone 20 and the wristlet 10 and used for communications S98 between the two devices 10, 20. For example, in one embodiment, mobile phone 20 inputs the hardware identifier received from wristlet 10 into a hash function. The output of the hash function is the unique key that both the mobile phone 20 and the wristlet 10 will utilize to communicate with each other over one or both of the BAN link 14 and the air interface link 16.

Once generated, the mobile phone 20 stores the key in its memory circuit and sends the key back to the wristlet 10 via the air interface link 16 S100. The wristlet 10 stores the key in its memory circuit and transmits the key it just received over the air interface link 16 to cellular telephone 20 over BAN link 14 S102. After receiving the key from wristlet 10 over BAN link 14, mobile phone 20 may validate the key S104. For example, if the BAN receiver at mobile phone 20 receives the key on the BAN link 14 within a predefined time period, the mobile phone 20 may compare the received key to the key it previously stored in its memory circuit. If the two keys match S106, the key received from the wristlet 10 over BAN link 14 is deemed valid, and the mobile phone 20 and wristlet 10 can BAN pair S108. Otherwise, if the mobile phone does not receive the key on the BAN link 14 within the predefined time period or if the keys do not match, the method 60 ends without the devices being BAN paired.

It should be noted that in some embodiments, the mobile phone 20 may activate its BAN receiver only when needed to conserve energy resources. For example, in one embodiment, the mobile phone 20 may be configured to activate its BAN receiver responsive to sending the key to the wristlet 10 over the first communication link. Once activated, the mobile phone 20 will listen to receive the key over the BAN link from the wristlet 10. If the key is received within a predetermined time, the mobile phone 20 can validate the key.

Figure 7D:
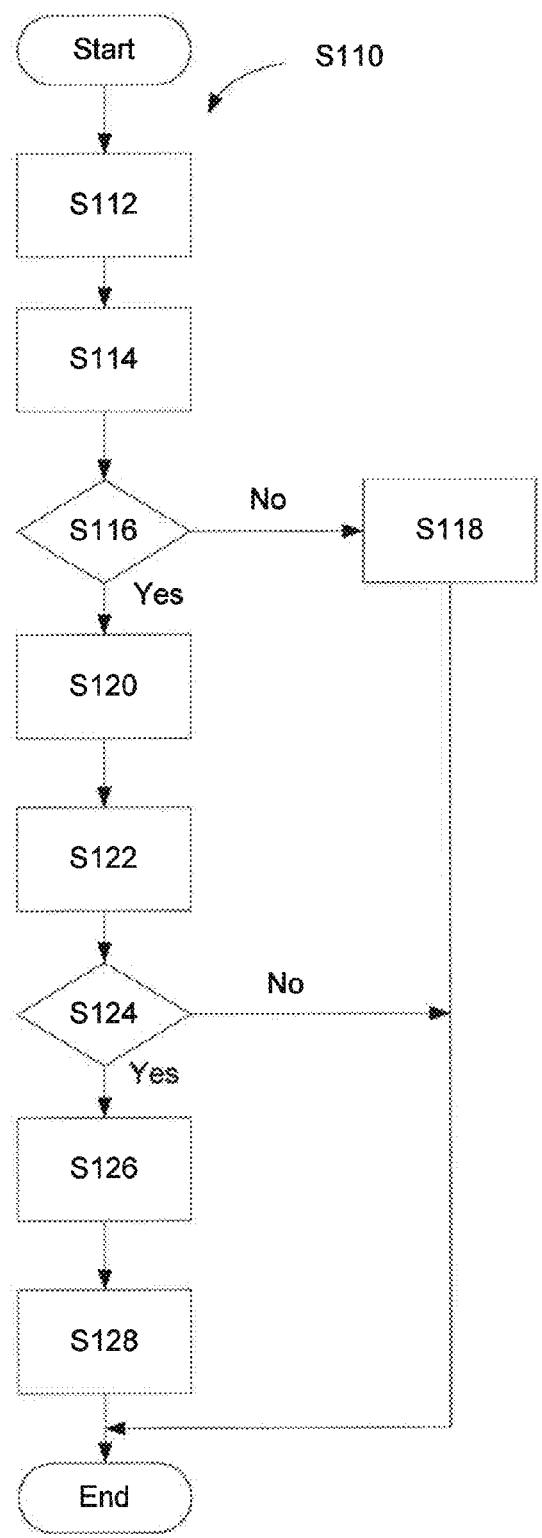
Figure 8A:
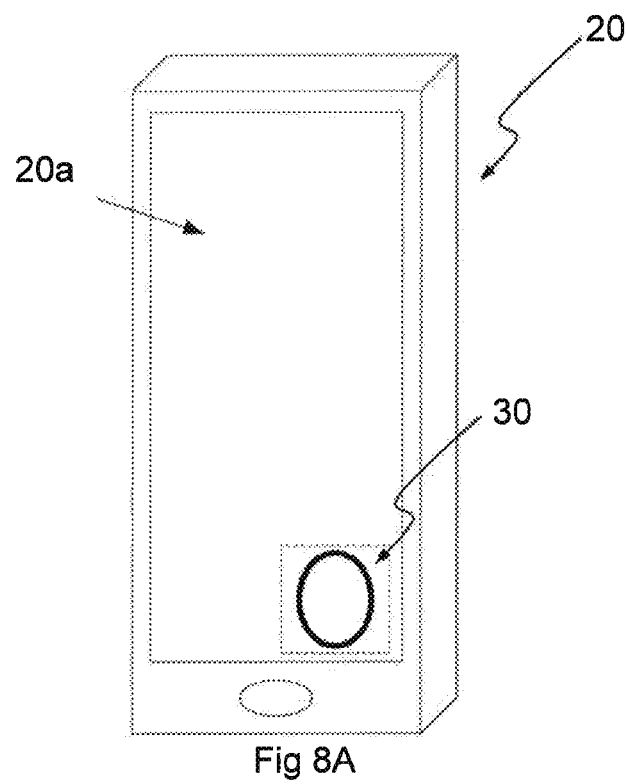
Figure 8B:
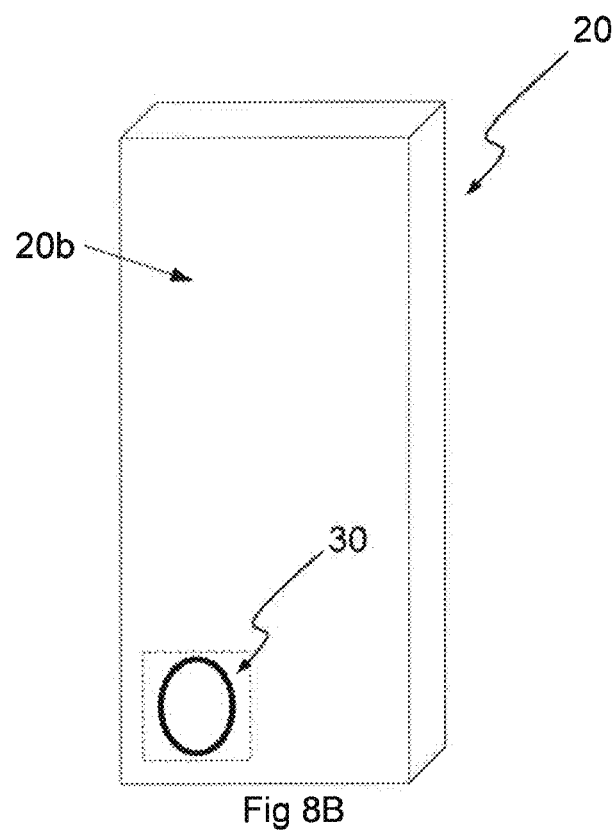

FIG. 7D illustrates a method S110 in which the cellular telephone 20 can determine whether the wristlet 10 is in contact with the body of the same user in accordance with one embodiment. Method S110 assumes that the mobile phone 20 has detected the presence of the wristlet 10.

Method S110 begins with the cellular telephone 20 sending a request to the wristlet 10 to request that the wristlet 10 "ping" the mobile phone 20 over a BAN link S112. Such a ping may comprise, for example, any signal or data sent by the wristlet 10. The mobile phone 20 listens on the BAN link for the ping S114. If the mobile phone 20 does not receive the ping over the specified BAN link S116, the mobile phone can determine that the wristlet 10 is not in contact with the body of the same user that is holding the mobile phone 20 S118 and the method ends. If the mobile phone 20 does receive the ping over the specified BAN link, however S116, the mobile phone determines that the wristlet 10 is in contact with the same user that is holding the mobile phone 20 S120.

The mobile phone 20, in one embodiment, then displays a prompt to the user prompting him/her to indicate whether the mobile phone should or should not BAN pair with the wristlet 10 S122. If the user indicates that the mobile phone 20 should not BAN pair with the wristlet 10 S124, the method ends. Otherwise, the mobile phone sends a key to the wristlet 10 S126. The wristlet 10, upon request, will then send the key back to the mobile phone 20, as previously described. By way of example only, consider a mobile phone 20 that displays a passcode screen to a user whenever the user wishes to access the mobile phone functions.

Conventionally, a user would have to manually input a predefined passcode to unlock the mobile phone 20 each time the user wanted to unlock the mobile phone 20. With the method described above, however, wristlet 10 would BAN pair with the mobile phone 20, and would simply send the key to the mobile phone 20 responsive to a request for the key. A valid key would cause the mobile phone 20 simply unlock, thereby allowing the user of the mobile phone 20 to bypass the passcode screen. Alternatively, the method of the present disclosure may be configured to allow the user to bypass the passcode screen based on the determination that both devices 20, 10 are in contact with the body of the same user, and on the determination that the wristlet 10 has provided the mobile phone 20 the proper key via the BAN link 14.

Once the mobile phone 20 and the wristlet 10 are BAN paired, the two devices 20, 10 may communicate any type of data needed or desired. For example, in one embodiment, the mobile phone 20 can control the transmission of data by the wristlet 10 by selectively enabling and disabling a BAN transmitter at the wristlet 10 S128. Particularly, the mobile phone 20 can be configured to generate and send signals or commands to the wristlet 10 via the air interface link 16 or the BAN link 14. Upon receipt, the wristlet 10 would either enable or disable its transmitter in accordance with the received signals. In this manner, the mobile phone 20 can help to conserve power resources at wristlet 10.

Such functions are beneficial, for example, whenever communications between the two devices 10, 20 are completed or have been idle for some predetermined time. However, those of ordinary skill in the art should appreciate that sending explicit commands or signals are not required for the present disclosure. In another embodiment, for example, the wristlet 10 is configured to detect when a communications function has been completed, such as when a user has successfully logged onto mobile phone 20. Upon such detection, the wristlet 10 may be configured to autonomously disable its transmitter(s), thereby stopping communications with mobile phone 20. To re-establish communications, the wristlet 10 need only to provide the key is stored in its memory to the mobile phone 20. If valid, the mobile phone 30 can once again communicate with the wristlet 10. Alternatively, the process of establishing the BAN links 14, 16 and pairing the two devices 20, 10, as previously described, may be repeated.

It should be noted that the previously described embodiments illustrate only one of the links as using the user's body as a transmission medium. However, this is for illustrative purposes only. Any of the embodiments described herein may be configured to employ the user's body as a transmission medium for communication in both directions (i.e., a b-directional BAN link 14). In such embodiments, both the mobile phone 20 and the wristlet 10 could comprise corresponding BAN transceivers, and thus, communicate all signals and data via a bi-directional BAN link 14.

Those of ordinary skill in the art should readily appreciate that the present disclosure is not limited to pairing a mobile phone 20 and a wristlet 10, but rather, may be implemented to pair other devices in addition to, or in lieu of, devices 10, 20. For example, the wristlet 10 need not comprise a wristlet, but rather, may be embodied as any wearable device, such as a ring, a necklace or a coin in the pocket of the user, for example, as shown in FIG. 4.

Figure 9A:
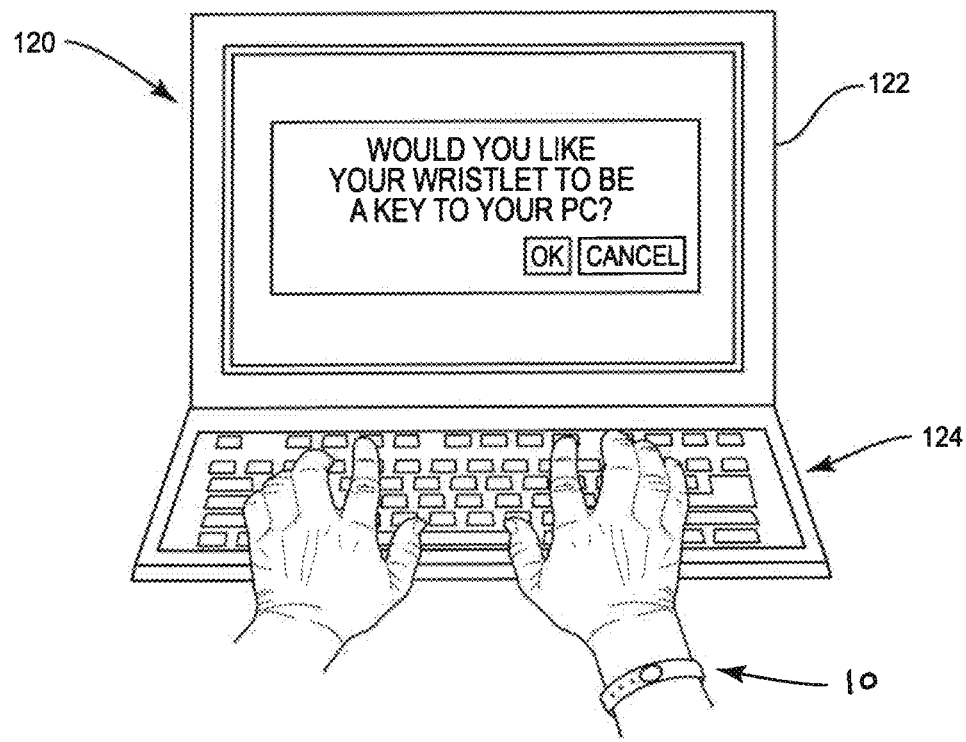
FIG. 9A-D are perspective views illustrating other types of wireless devices configured to be BAN paired according to one or more embodiments of the present disclosure.

In one embodiment, as shown in FIG. 9A, the wristlet 10 allows the user to communicate with a computing device 120, and more particularly, the keyboard 124, via one or both of the BAN links 14, 16. In this embodiment, the wristlet 10 and the computing device pair with each other upon detecting that the user wearing the wristlet 10 is also touching the keyboard 124. The computing device may be provided with a BAN enabled access module, as described above. In accordance with the methods described above, the user could unlock the keyboard 124 using the wristlet 10, and once unlocked, utilize the computing device to perform any known function. The wristlet 10, however, could be used so as to restrict use of the computing device to certain users having a wristlet 10 identified by a given identifier.

Figure 9B:
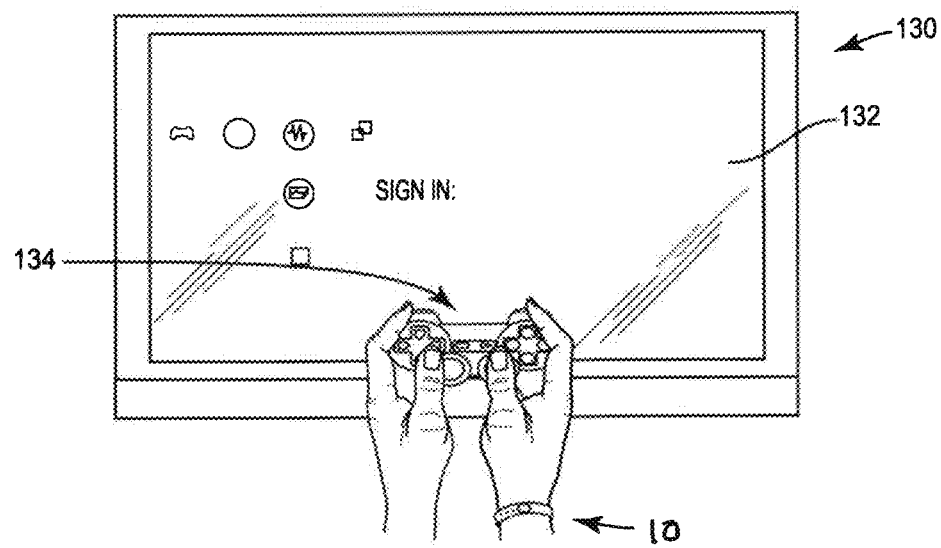

In one embodiment, as shown in FIG. 9B, the wristlet 10 is configured to allow a user to access and use a game system having a display. The game system may be provided with a BAN enabled access module, as described above. Particularly, the wristlet 10 BAN pairs with the hand held controller, and as a result of the pairing, permits the user to access and use the game system 130. In one embodiment, the user wearing wristlet 10 may automatically log into a game or on-line system, for example, whenever the controller 134 and the wristlet 10 are in contact with the body of the same user, as described in the previous embodiments.

Figure 9C:
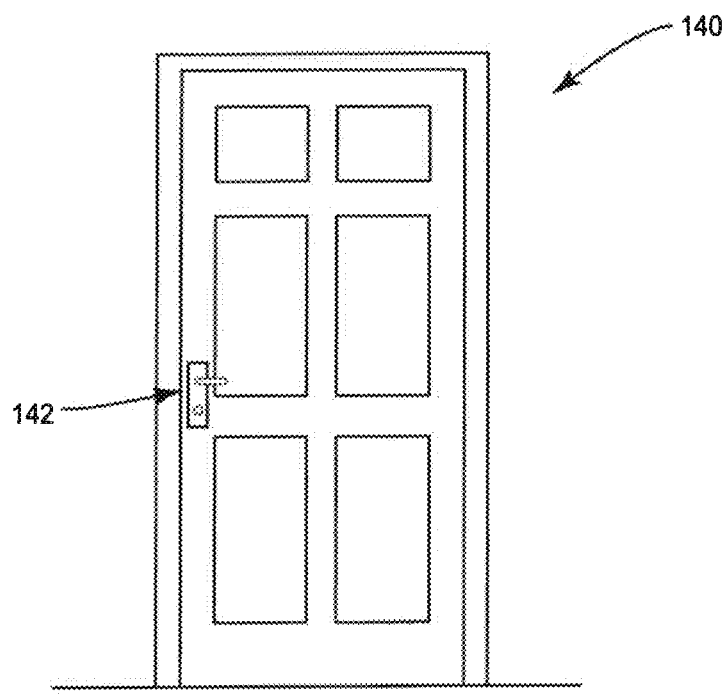

Similarly, as seen with the system 140 in FIG. 9C, the wristlet 10 may be configured to facilitate access for a user into a locked room. In these embodiments, the wristlet 10 could be configured to BAN pair with the door handle 142, for example, when the user grabs the handle to gain entry. The door handle 142 may be provided with a BAN enabled access module, as described above. Provided entry is permitted, the door would be unlocked to allow the user in the room. Otherwise, the door would remain locked and the user would be denied entry.

Figure 9D:
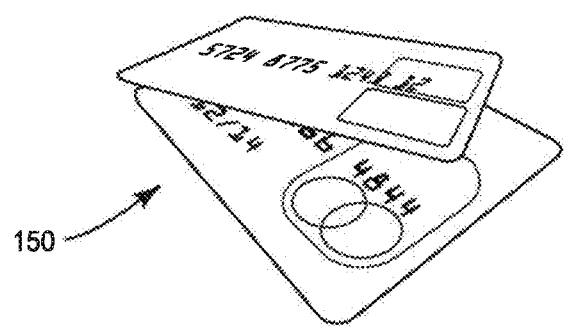

In yet another embodiment, seen in FIG. 9D, the wristlet 10 may be used to facilitate a payment by the user. In this embodiment, a credit card 150 or similar financial vehicle would only be validated for use by a downstream server, for example, if the person "swiping" the card to effect payment is the person that owns the card. The credit card 150 may be provided with a BAN enabled access module, as described above. In one embodiment, such "ownership" may be determined responsive to detecting that the user swiping the card 110 is also the user wearing the wristlet 10. Thus, the wristlet 10, in this embodiment, would communicate and pair with the card 150 so long as the user wore the wristlet 10 on his/her wrist and touched the card.

The present invention may, of course, be carried out in other ways than those specifically set forth herein without departing from essential characteristics of the invention. As described above, the present disclosure is not limited to BAN pairing a mobile phone 20 and a wristlet 10, but rather, may be implemented to pair other devices as well. Accordingly, the present embodiments are to be considered in all respects as illustrative and not restrictive, and all changes coming within the meaning and equivalency range of the appended claims are intended to be embraced therein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method, performed in a Body Area Network, BAN, enabled wireless communication device, for creating access to said wireless communication device, comprises:
   detecting the presence of a user's body by using a BAN enabled access module part of said wireless communication device;
   collecting a biometric data of said user by using a scanner comprised in said BAN enabled access module;
   receiving authentication data at said BAN enabled access module through BAN from a BAN enabled peripheral device, the authentication data being a predefined user-input code; and
   allowing access to said wireless communication device when said collected biometric data and said received authentication data are valid; and
   wherein, upon determining that the authentication data is not stored in the BAN enabled peripheral device, the method further comprising:
      requesting the authentication data from the user and receiving the authentication data from the user vie a user input of the wireless communication device; and
      transferring the authentication data received from the user to the BAN enabled peripheral device for storage.

2. The method for creating access to said wireless communication device according to claim 1, wherein said step of collecting biometric data comprises:
   starting the scanner when detecting a body part of said user by the BAN enabled access module; and
   collecting biometric data by scanning said body part.

3. The method for creating access to said wireless communication device according to claim 1, comprises:
   sending a request for said authentication data at the same time as said scanner starts collecting biometric data.

4. The method for creating access to said wireless communication device according to claim 1, wherein said step of allowing access comprises:
   analysing whether said received authentication data and said collected biometric data are valid; and
   unlocking said wireless communication device when said received authentication data and said collected biometric data are valid.

5. The method according to claim 1, comprises:
   detecting that said BAN enabled peripheral device is proximate to said wireless communication device;
   determining whether both the wireless communication device and the BAN enabled peripheral device are in contact with said user's body; and
   pairing said wireless communication device with the BAN enabled peripheral device using BAN when both the wireless communication device and the BAN enabled peripheral device are in contact with the user's body.

6. The method of claim 5 wherein pairing with the BAN enabled peripheral device using BAN when both the wireless communication device and the BAN enabled peripheral device are in contact with said user's body comprises:
   generating a key within said wireless communication device based on a unique identifier received over a first communication link from the BAN enabled peripheral device;
   transmitting the generated key to the BAN enabled peripheral device over the first communication link;
   receiving the key from the BAN enabled peripheral device over a second communication link; and
   pairing said wireless communication device with the BAN enabled peripheral device when the key received over the second communication link is a valid key.

7. The method of claim 1, wherein the wireless communication device is configured to display a passcode lock screen to the user, and comprising bypassing the passcode lock screen responsive to determining that both the authentication data and the biometric data is valid.

8. The method of claim 1, wherein said body part is one of a digit of a hand, a part of a digit of a hand, an eye, a palm of a hand or a part of a palm of a hand.

9. The method of claim 1, wherein said biometric data is any of a fingerprint, palm print or iris recognition.

10. The method of claim 1, wherein the authentication data is stored by the BAN enabled peripheral device and the BAN enabled peripheral device deletes the authentication data upon losing BAN contact with the user.

11. A system for creating access to a wireless communication device, wherein the system comprises:
   said wireless communication device; and
   a Body Area Network, BAN, enabled peripheral device paired with said wireless communication device;
   wherein said wireless communication device comprises:
      a Body Area Network, BAN, enabled access module configured for creating access to said wireless communication device, the BAN enabled access module comprising:
         a scanner for scanning a body part of a user and collecting biometric data of said body part;
         a BAN enabled electrode configured for receiving authentication data from said BAN enabled peripheral device, the authentication data being a predefined user-input code;
   wherein said BAN enabled peripheral device is configured for transmitting said authentication data upon request and comprises:
      a sensor configured for detecting the presence of said user's body;
      a communication interface configured to communicate with said wireless communication device by using BAN;

a memory circuit configured to store said authentication data;
a processing circuitry configured to:
store, in the memory circuit, the authentication data in the memory circuit and delete the authentication data when the sensor no longer detects the presence of the user's body, and
transmit said authentication data to the BAN enabled access module, when a request for authentication data is received;
wherein access is allowed to said wireless communication device when said collected biometric data and said received authentication data are valid; and
wherein the wireless communication device, upon determining that the authentication data is not stored in the BAN enabled peripheral device, is configured to:
request the authentication data from the user and receive the authentication data from the user via a user input of the wireless communication device; and
transfer the authentication data received from the user to the BAN enabled peripheral device for storage.

12. The system according to claim 11, wherein said BAN enabled electrode is configured for controlling said scanner, comprises:
a detector configured for detecting the presence of said users body;
a processing circuitry configured to:
send instructions to said scanner to start scanning and collecting said biometric data when the presence of the user's body is detected; and
receive said authentication data from said peripheral device by using BAN when the presence of said users body is detected.

13. The system according to claim 11, wherein the processing of said BAN enabled electrode is further configured for sending a request for authentication data at the same time as the scanner starts collecting biometric data.

14. The system according to claim 11, wherein said received authentication data and said collected biometric data are analysed and said wireless communication device is unlocked when said received authentication data and said collected biometric data are valid.

15. The system according to claim 11, wherein said body part is one of a digit of a hand, a part of a digit of a hand, an eye, a palm of a hand or a part of a palm of a hand.

16. The system according to claim 11, wherein said biometric data is any of a fingerprint, palm print or iris recognition.

17. A Body Area Network, BAN, enabled access module associated with a wireless communication device, configured for allowing access to said wireless communication device comprises:
a scanner for scanning a body part of a user and collecting biometric data associated with said body part;
a BAN enabled electrode comprises:
a detector for detecting the presence of said body part;
a processing circuitry configured to:
send instructions to said scanner to start scanning and collecting biometric data when said body part is detected; and
receive authentication data from a BAN enabled peripheral device by using BAN, the authentication data being a predefined user-input code, wherein access is allowed to said wireless communication device when said collected biometric data and said received authentication data are valid; and
upon determining that the authentication data is not stored in the BAN enabled peripheral device, the processing circuitry is configured to:
request the authentication data from the user and receive the authentication data from the user via a user input of the wireless communication device; and
transfer the authentication data received from the user to the BAN enabled peripheral device for storage.

18. The BAN enabled access module according to claim 17, wherein said processing circuitry is configured to:
transmitting said received authentication data to said wireless communication device.

19. The BAN enabled access module according to claim 17, wherein said body part is one of a digit of a hand, a part of a digit of a hand, an eye, a palm of a hand or a part of a palm of a hand.

20. The BAN enabled access module according to claim 17, wherein said biometric data is any of a fingerprint, palm print or iris recognition.

21. The BAN enabled access module according to claim 17, wherein the authentication data is stored by the BAN enabled peripheral device and the BAN enabled peripheral device deletes the authentication data upon losing BAN contact with the user.

22. A wireless communication device comprises:
a Body Area Network, BAN, enabled access module, configured for creating access to said wireless communication device comprises:
a scanner for scanning a body part of a user and collecting biometric data of said body part;
a BAN enabled electrode; and
a detector for detecting the presence of said body part;
a processing circuitry configured to:
send instructions to said scanner to start scanning and collecting biometric data when said body part is detected; and
receive authentication data from a BAN enabled peripheral device by using BAN, the authentication data being a predefined user-input code, wherein access is allowed to said wireless communication device when said collected biometric data and said received authentication data are valid; and
upon determining that the authentication data is not stored in the BAN enabled peripheral device, the processing circuitry is configured to:
request the authentication data from the user and receive the authentication data from the user via a user input of the wireless communication device; and
transfer the authentication data received frown the user to the BAN enabled peripheral device for storage.

23. The wireless communication device according to claim 22 wherein said processing circuitry is configured to:
send a request for said authentication data to said BAN enabled peripheral device by using BAN.

24. The wireless communication device according to claim 22 wherein said BAN access module is provided at one of a face portion of said wireless communication device.

25. The wireless communication device according to claim 22 comprises:
a communications interface circuit configured to communicate data and signals with a peripheral device disposed proximate to the wireless communication device; and the processing circuitry configured to:
- determine whether both the wireless communication device and the peripheral device are in contact with a user's body; and
- pair the wireless communication device with the peripheral device using BAN when both the wireless communication device and the peripheral device are in contact with the user's body.

26. The wireless communication device of claim 25 wherein to pair with the peripheral device using BAN, the processing circuitry is configured to:
- generate a key based on a unique identifier received over a first communication link from the peripheral device;
- transmit the generated key to the peripheral device over the first communication link;
- receive the key from the peripheral device over a second communication link; and
- pair said wireless communication device with the peripheral device when the key received over the second communication link is a valid key.

27. The wireless communication device of claim 26 wherein the second communication link comprises a BAN link that uses the user's body as a transmission medium, and wherein the processing circuitry is further configured to:
- send a request to the peripheral device to ping the wireless communication device over the BAN link;
- receive the ping from the peripheral device over the BAN link; and
- determine whether both the wireless communication device and the peripheral device are in contact with the user's body responsive to receiving the ping.

28. The wireless communication device of claim 22 comprising a display, and wherein the processor circuit is configured to:
- display a passcode lock screen by said display to the user; and
- bypass the passcode lock screen responsive to determining that both the wireless communication device and the BAN enabled peripheral device are in contact with the user's body.

29. The wireless communication device of claim 22, wherein said body part is one of a digit of a hand, a part of a digit of a hand, an eye, a palm of a hand or a part of a palm of a hand.

30. The wireless communication device of claim 22, wherein said biometric data is any of a fingerprint, palm print or iris recognition.

31. The wireless communication device of claim 22, wherein the authentication data is stored by the BAN enabled peripheral device and the BAN enabled peripheral device deletes the authentication data upon losing BAN contact with the user.

* * * * *

UNITED STATES PATENT AND TRADEMARK OFFICE
CERTIFICATE OF CORRECTION

PATENT NO. : 9,826,561 B2
APPLICATION NO. : 14/509569
DATED : November 21, 2017
INVENTOR(S) : Thomas Bolin It is certified that error appears in the above-identified patent and that said Letters Patent is hereby corrected as shown below:

In the Claims

Claim 1, Line 20, replace "vie" with --via--.

Claim 22, Line 26, replace "frown" with --from--.

Signed and Sealed this
Sixth Day of March, 2018

Andrei Iancu
*Director of the United States Patent and Trademark Office*